United States Patent
Borkovic

(10) Patent No.: US 11,442,794 B1
(45) Date of Patent: Sep. 13, 2022

(54) EVENT ASSIGNMENT FOR SYNCHRONIZATION OF CONCURRENT EXECUTION ENGINES

(71) Applicant: Amazon Technologies, Inc., Seattle, WA (US)

(72) Inventor: Drazen Borkovic, Los Altos, CA (US)

(73) Assignee: Amazon Technologies, Inc., Seattle, WA (US)

(*) Notice: Subject to any disclaimer, the term of this patent is extended or adjusted under 35 U.S.C. 154(b) by 532 days.

(21) Appl. No.: 16/585,575

(22) Filed: Sep. 27, 2019

(51) Int. Cl.
*G06F 9/38* (2018.01)
*G06F 9/52* (2006.01)
*G06N 3/063* (2006.01)
*G06F 9/30* (2018.01)

(52) U.S. Cl.
CPC ............ *G06F 9/52* (2013.01); *G06F 9/30098* (2013.01); *G06F 9/3838* (2013.01); *G06N 3/063* (2013.01)

(58) Field of Classification Search
None
See application file for complete search history.

(56) References Cited

U.S. PATENT DOCUMENTS

2019/0122145 A1* 4/2019 Sun ................... G06F 40/169

OTHER PUBLICATIONS

Fidge, "Timestamps in Message-Passing Systems that Preserve the Partial Ordering", Australian Computer Science Communications, vol. 10, No. 1, Feb. 1988, pp. 56-66.
Lamport, "Time, Clocks, and the Ordering of Events in a Distributed System", Communications of the ACM, vol. 21, No. 7, Jul. 1978, pp. 558-565.
Mattern, "Virtual Time and Global States of Distributed Systems", Parallel and Distributed Algorithms, Elsevier Science Publishers B.V., 1989, pp. 120-131.

* cited by examiner

*Primary Examiner* — Scott C Sun
(74) *Attorney, Agent, or Firm* — Kilpatrick Townsend & Stockton LLP

(57) ABSTRACT

Techniques for synchronizing operations of execution engines of an integrated circuit device are disclosed. A description of a plurality of operations to be performed by the execution engines may be obtained. The plurality of operations may be connected through a plurality of edges. A dependency vector may be generated for each operation of the plurality of operations. The dependency vector of a corresponding operation may include a set of values that are calculated based on the set of values of one or more dependency vectors calculated for one or more immediately preceding operations of the plurality of operations. An event register of a plurality of event registers may be assigned, for each edge of one or more of the plurality of edges, to the corresponding edge based on the dependency vector generated for a start operation associated with the corresponding edge.

20 Claims, 12 Drawing Sheets

EVENT ASSIGNMENT FOR SYNCHRONIZATION OF CONCURRENT EXECUTION ENGINES

BACKGROUND

Integrated circuit devices, such as processors and accelerators, can include multiple execution engines. For example, an integrated circuit device can include parallel execution engines that are capable of performing large, multi-stage computations, such as convolutions. As another example, an integrated circuit device can include execution engines for more specific operations, such as accumulating values or performing floating point math. The data on which the execution engines operate can be retrieved from a memory of the integrated circuit device. Results produced by the execution engines can further be written to the memory. The memory may be limited in size, due to considerations such as the available space on the chip for the memory.

In some instances, integrated circuit devices having multiple execution engines can be used to execute operations of an artificial neural network. Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network, such as a deep neural network, includes multiple layers of processing nodes. Each processing node in a layer can perform computations on input data generated by processing nodes in the preceding layer to generate output data. For example, a processing node may perform a set of arithmetic operations such as multiplications and additions to generate an intermediate output, or perform post-processing operations on the intermediate output to generate a final output. An artificial neural network may include thousands or more of processing nodes and millions or more of parameters.

BRIEF DESCRIPTION OF THE DRAWINGS

Various embodiments in accordance with the present disclosure will be described with reference to the drawings, in which.

DETAILED DESCRIPTION

Figure 1:
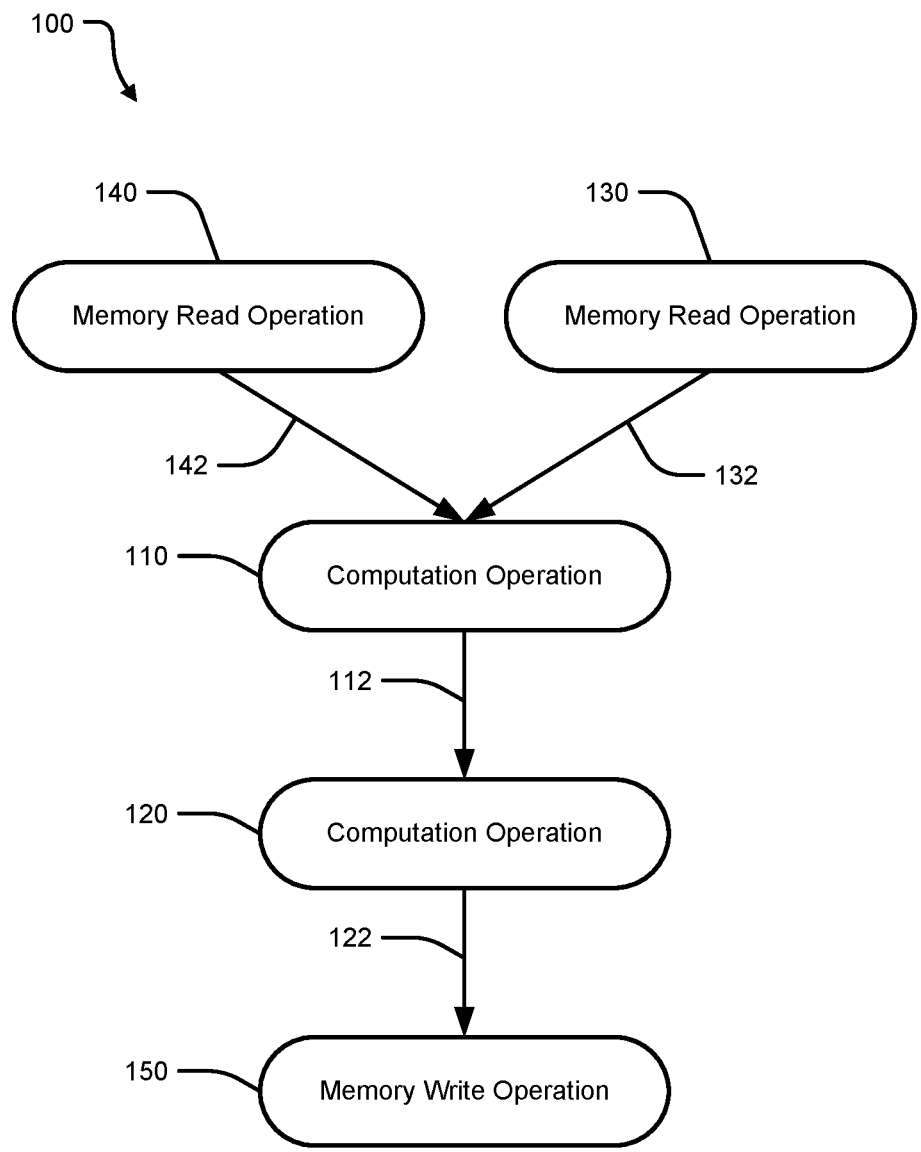
FIG. 1 illustrates a diagram showing an example dataflow graph.

The operations of an integrated circuit device such as a processor can be directed by instructions, which can be generated for the integrated circuit device by a compiler. A compiler is a software program that transforms programs written in human-readable programming language into machine language that can be understood by the integrated circuit device. The output of a compiler can be referred to as program code, program instructions, or machine instructions, among other examples.

When an integrated circuit device includes multiple execution engines, in various examples, the compiler for the device can produce sets of instructions for each execution engine. The instructions for an execution engine can includes steps such as reading data from memory of the device, performing a computation on the data, and writing a result of the computation back to the memory of the device. In some examples, the execution engines can independently execute respective sets of instructions, so that the execution engines can operate in parallel.

In some examples, however, the operation of one execution engine may be dependent on the operation of another execution engine. For example, a result computed by one execution engine may be needed as the input of an operation to be performed by a second execution engine. Limitations of the integrated circuit device can also cause dependencies between the execution engines. For example, the device may have a limited amount of memory or a limited number of registers in which inputs for and results from the execution engines can be stored. In this example, one execution engine may need to store a result in a memory location in which the inputs for another execution engine are stored.

When the operations of the execution engines of an integrated circuit device can have dependencies such as those described above, the compiler for the device can capture the dependencies, for example, in a dependency or dataflow graph. In a dataflow graph, nodes in the graph can represent operations or sets of operations to be performed by individual execution engines. The edges or connections between the nodes can represent dependencies between the operations at the nodes.

In some examples, the integrated circuit device can include synchronization circuitry (e.g., implementing semaphores, queues, or another type of synchronization primitive), which can be used to synchronize the execution engines around a dependency. For example, when an edge in the dataflow graph indicates a dependency between two different execution engines, the compiler can output an instruction that activates a semaphore circuit. As another example, the compiler can generate instructions that cause a first execution engine to write a result to a queue, from which a second execution engine can read the result for use in an operation. Synchronization circuits, however, may be costly in terms chip area and complexity. Use of the chip area can reduce available space for other components, such as memory, and increased complexity can increase the likelihood that the device does not operate correctly.

In some examples, synchronization of execution engines can be achieved through the use of event registers. One benefit of event registers is that access can be performed via a bus, and can therefore only require a few clock cycles to check the status of an event register. In order to reuse events correctly, in some examples, barriers may be introduced to synchronize all execution engines having events set in the event registers. For example, when all the event registers are set by various set-event instructions, a barrier may be introduced preventing further set-event instructions from being executed until all corresponding wait-on-event instructions have been executed. After all wait-on-event instructions comprising a barrier have been executed, all event registers may be available for reuse. In some examples, the number of barriers may be reduced, thereby improving event reuse, by propagating knowledge of event consumption to execution engines other than the execution engine where the event is consumed without synchronizing all engines via barriers. In general, barriers are undesirable since the barriers can cause busy execution engines to unnecessarily wait for another, slower execution engine.

One way to reduce the number of barriers is to add more event registers, however the number of event registers available for engine synchronization is limited for at least the following reasons. First, additional event registers require more silicon area. Second, since event registers are shared among all execution engines, the physical design of a circuit with many event registers requires significant routing resources. Third, the number of events is fixed when the chip is designed and manufactured, and therefore cannot be increased when larger sets of operations (for larger neural networks) are later compiled. Last, some event registers are reserved for purposes other than engine synchronization such as debugging, measurement of DMA transfer duration, host synchronization at accelerator initialization, and inference completion.

In various implementations, provided are systems, methods, and other techniques for assigning event registers to edges between operations to be performed by multiple execution engines. The described techniques produce assignments that require fewer event registers than conventional techniques. In some embodiments, the relationships between different operations are tracked by generating a dependency vector for each operation. Each dependency vector may include a set of values. The number of values in the set of values may be equal to the number of execution engines, such that each value of the set of values may correspond to a different execution engine. For example, a first value may correspond to a processing element array, a second value may correspond to an activation engine, and a third value may correspond to a pooling engine.

The dependency vectors allow the compiler to quickly determine a relationship between two operations. For example, a first operation is considered to follow a second operation if each value of the dependency vector for the first operation is greater than or equal to each corresponding value of the second operation. Alternatively, the second operation is considered to follow the first operation if each value of the dependency vector for the second operation is greater than or equal to each corresponding value of the first operation. If neither of the above are true, then the operations can be performed in either order.

The relationships between operators, as determined using the generated dependency vectors, are used to determine whether an event register can be reused. In one example, an event register can be reused for a new edge if the start operation associated with the new edge follows the end operation associated with the previous edge with the same event. In some instances, the compiler may determine whether the start operation associated with the new edge follows any end operation associated with any previous edges. In some instances, the compiler may first look to the end operation of the edge with the most-recently assigned event register or to the end operation of the edge with the least-recently assigned event register.

In various examples, the integrated circuit device includes multiple execution engines, which may be able to operate independently but whose operations may have data and/or resource dependencies. In various examples, the techniques discussed herein can include receiving an input data set that describes the operations to be performed by the integrated circuit device. The input data can, for example, be represented as a dataflow graph. From the input data set, a memory operation to be performed by a first execution engine can be identified, as well as an operation that is to be performed by a second execution engine and that requires that the memory operation be completed. To accommodate this dependency, the instructions for the first execution engine can include a set-event instruction and the instructions for the second execution engine can include a wait-on-event instruction. The wait-on-event instruction can cause the second execution engine to wait for the first execution engine to reach the set-event instruction. In this way, the two execution engines can be synchronized around the data or resource dependency.

In various examples, the integrated circuit device can implement events using hardware registers. In these examples, an event is set when, for example, a register contains a value of "1" and is not set when the register contains a value of "0." Hardware registers can have a small footprint on the chip die, and little circuitry is needed to write a register value or check a register value. Thus, using the techniques discussed herein, synchronization of the execution engines in the integrated circuit device can be accomplished without the integrated circuit needing specialized synchronization circuitry.

Upon assigning the event registers, the compiler may generate instructions for an integrated circuit device that incorporate the event register assignments. When the instructions are executed by the execution engines, the execution engines may read from and/or write to the event registers in accordance with the event register assignments.

FIG. 1 illustrates a diagram showing an example dataflow graph 100. The dataflow graph 100 can be generated, for example by a compiler, and can represent sequences of operations to be performed by an integrated circuit device. The integrated circuit device can include multiple execution engines. Examples of types of execution engines the device can have include a computational array, also referred to herein as an array of processing engines, an execution engine executing an activation function, an execution engine executing a pooling operation, and a direct memory access (DMA) engine, among other examples.

In various examples, each node in the data flow graph can represent an operation to be performed by a particular execution engine of the integrated circuit device. The operations can include, for example, computations and memory operations. For example, the operation 110 can include a computation operation to be performed by a computational array and the operation 120 can include a computation to be performed by a pooling engine. In some examples, the operations 110 and/or 120 can require an execution engine to execute one or more instructions to complete the operation. Examples of operations represented by the nodes of the dataflow graph 100 may include operations for specific execution engines, such as "matrix multiply," "pool," and "activate," among other examples, and certain operations that can be performed by any execution engine, such as "NOP" operations. Examples of memory operations include memory read operations, such as the operations 140 and 130, and memory write operations, such as the operation 150. In various examples, the memory operations read/write can be performed by different execution engines of the integrated circuit device.

In the example of FIG. 1, connections between operations, which can also be referred to as edges, can represent data and/or resource dependencies between the operations. A data dependency can occur, for example, when an execution engine uses the output of another execution engine as an input for a computation. A resource dependency can occur, for example, when one execution engine needs to use a memory location that a second execution engine is also using. For example, the second execution engine may need to write a value to the memory location, and the first execution engine may need to read the value and use the value in a computation. As another example, the second execution engine may be reading or writing a value to a memory location, and the first execution engine may (due, for example, to limited memory being available) need to write a value to the same memory location.

In various examples, each operation in the graph 100 includes at least one input edge, representing inputs to the operation, or at least one output edge, representing an output of the operation. For example, the edge 142 from the operation 140 and the edge 132 from the operation 130 each indicate that the results from the operations 140 and 130 are inputs to the operation 110. As a further example, the edge 112 from the operation 110 to the operation 120 indicates that the result of the operation 110 is the input to the operation 120. As a further example, the edge 122 from the operation 120 to the operation 150 indicates that the result of the operation 120 is the input to the operation 150.

Figure 2:
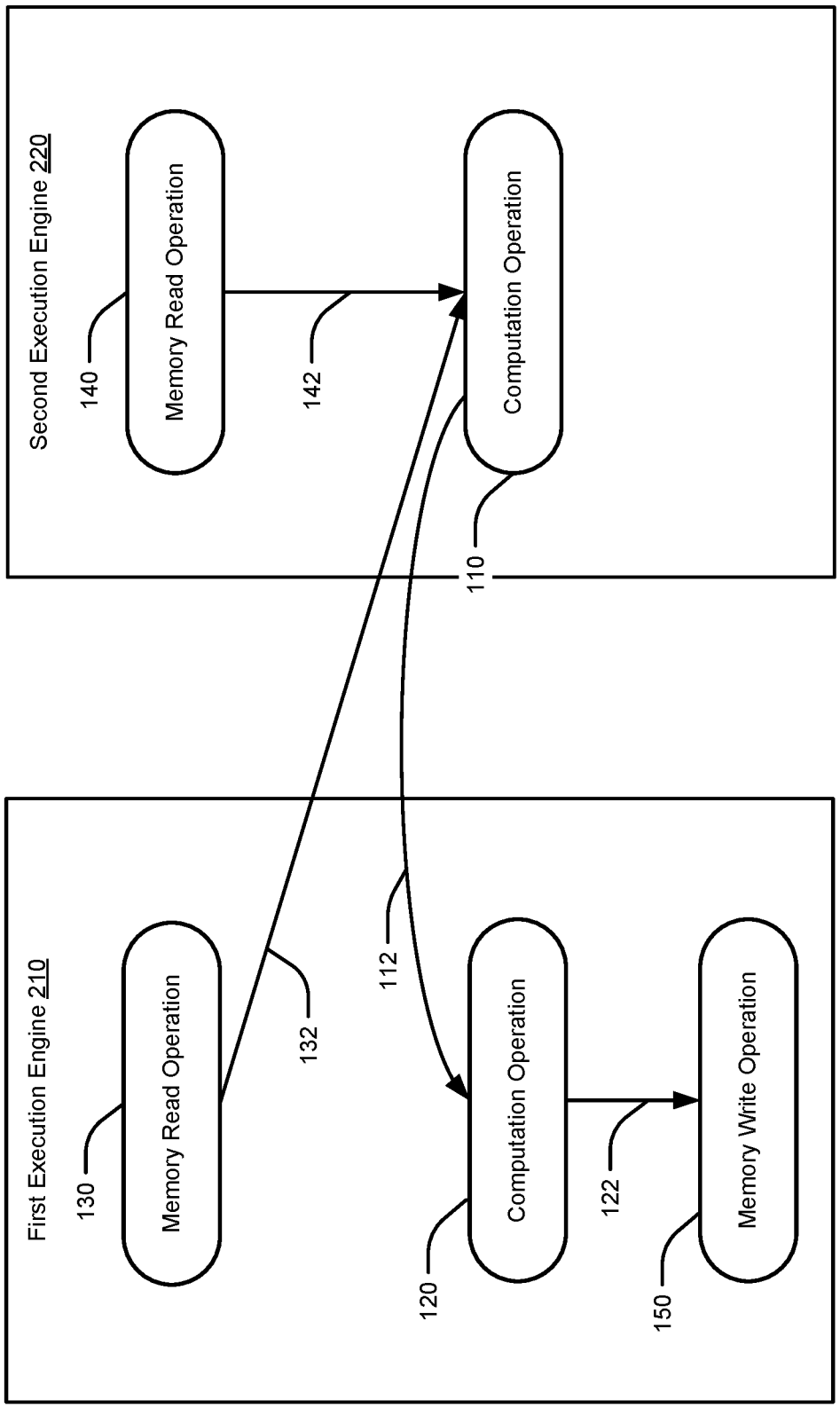
FIG. 2 illustrates a diagram showing an example dataflow graph alongside execution engines.

FIG. 2 illustrates a diagram showing the operations in the dataflow graph 100 of FIG. 1 as these operations may be executed by a first execution engine 210 and a second execution engine 220. The first execution engine 210 can be, for example, a computational array of an integrated circuit device, and the second execution engine can be a pooling engine, among other examples.

In the example of FIG. 2, the operation 130, which includes a memory read operation, is performed by the first execution engine 210 and the operation 140, which also includes a memory read operation, is performed by the second execution engine 220. The second execution engine 220 then performs the operation 110, which includes a computation operation on the outputs of the operations 130 and 140. As illustrated by this example, the operation 110 uses the output of the memory read operation of the operation 130, and thus needs the operation 130 to complete before the computation can be performed. The edge 132 thus illustrates a data or resource dependency between the first execution engine 210 and the second execution engine 220. In contrast, the operation 110 also needs the memory read operation of the operation 140 to be completed, but because the operations 140 and 110 are performed by the same execution engine, the edge 142 may not represent a data or resource dependency because the second execution engine 220 may not need to wait on another execution engine in order to proceed to the operation 110.

Similarly, the edge 112 illustrates a dependency between the first execution engine 210 and the second execution engine 220. For example, the operation 120 may require the result of the operation 110. The edge 122 further illustrates a non-dependency, since the operation 150 can follow the operation 120 without needing to wait for the operations of another execution engine to complete.

To accommodate the dependencies such as those illustrated by the examples of FIGS. 1 and 2, in various examples, the instructions generated for the integrated circuit device can make use of event registers of the integrated circuit device. In various examples, registers are a type of memory location in the integrated circuit device that can be written to by the execution engines of the integrated circuit device, and, in some cases, also be written to be devices outside of the integrated circuit device. Additionally, the execution engines can implement instructions that wait on a value to be written to a particular event register. When the value is written, the event is considered to have occurred or to have been set. Instructions that wait on an event can cause an execution engine to halt or stall further execution of instructions until the event occurs or has been set. When the event occurs before the execution unit executes the wait instruction, then the execution need not stop at the wait instruction.

In some examples, a bit in a physical register can represent an individual event. In some examples, each physical register represents an individual event. The integrated circuit device may have a fixed or limited number of event registers. For example, the integrated circuit device may have registers representing a maximum of 256 (or some other number) of events.

In various examples, the event registers can be used to synchronize the operations of two execution engines of the integrated circuit device. For example, the instructions for the operation 110 can be preceded by a "wait-for-event-and-clear" instruction, or instructions that effectively waits for an event (as discussed further below), which can identify an event register. In this example, the instructions for the operation 130 can be followed by a "set-event' instruction, that identifies the same event register. In this example, when the second execution engine 220 reaches the operation 110, the second execution engine 220 can first execute the "wait-for-event-and-clear" instruction, and check whether a particular value (e.g., a value of "1") has been set in the event register identified by this instruction. When the value has not been set, then the operation 130 has not yet completed, and the second execution engine 220 can stall. When the value is then set (or was already set when the instruction was executed), then the second execution engine 220 can proceed with the operation 110.

In various examples, a procedure for generating instructions for the integrated circuit device can include identifying each dependency in a data flow graph (or another representation of sequences of operations for the integrated circuit), and including set-event and corresponding wait-on-event instructions for each dependency. For example, the procedure can include traversing the dataflow graph, and identifying each occurrence of an edge where the edge starts at an operation for one execution engine and ends at an operation for a different execution engine. As a further example, the procedure can assign an event register to each such edge. Event registers can be assigned, for example, using a numerical identifier for each event. When generating instructions according to the data flow graph, the procedure can include, for each assigned event register, adding a "set-event" instruction to the instructions for the operation at the start of the edge, and a "wait-on-event-and-clear" instruction for the operation at the end of the edge. For example, the "set-event" instruction can be a last instruction of a set of instructions generated for the operation at the start of the edge, and the "wait-on-event-and-clear" instruction can be a first instruction of the instructed generated for the operation at the end of the edge.

In some examples, a "wait-on-event-and-clear" instruction (e.g., where waiting on an event is activated by a parameter for the instruction) can clear the event being waited on, as a step in the execution of the instruction. Clearing the event can mean writing a particular value to the event register, such as a value of "0." In some examples, an explicit "clear-event" instruction can be used to clear the event. Clearing an event register frees the register to be used again.

As noted above, in most cases the integrated circuit device has a limited number of event registers. The procedure for generating instructions for the integrated circuit can thus include keeping track of available event registers. For example, the procedure can maintain a count of the event registers, and, when traversing the dataflow graph, can increment the count for each event assigned to an edge. In this example, the count can be used to identify an event register to assign to the edge. Also in this example, when the count reaches the maximum number of available event registers, the procedure can introduce a synchronization point (alternatively referred to as a barrier). The synchronization point can cause one or more the execution engines in the integrated circuit device to stall until each execution engine is stalled. Stalling each of the one or more execution engines can ensure that any events being waited on by these execution engines have occurred, and the corresponding event registers have been cleared.

A synchronization point can thus cause all event registers to be cleared and freed for use. Stalling of the execution engines can be accomplished, for example, by having the execution engines executing a "wait-on-event-and-clear" for the one event register, where the event register is written, for example, by a host processor that is capable of checking whether the execution engines are each stalled. Alternatively or additionally, stalling may be accomplished by inserting synchronization instructions into the sets of instructions generated for each execution engine. A synchronization instruction can, for example, cause an execution engine to wait on another execution engine to execute a synchronization instruction. A synchronization instruction can take the form of, for example, a halt instruction that also notifies the host processor that the execution engine has halted. In these examples, the host processor can track whether each of the execution engines are stalled, and can cause the execution engines to continue executing instructions once each of the execution engines has stalled.

The procedure for generating instructions may assign individual events, for example 256 events or another number of events, to dependency edges of the dataflow graph in order to implement the dependencies represented by the edges. In some examples, the events may correspond to indexed locations in an event register, which alternatively may referred to as different event registers. The event registers may be a fixed length, for example, 256 bits or another length. To assign the event registers, the procedure can, for example, maintain an array of 256 entries that represent the event registers.

Figure 3:
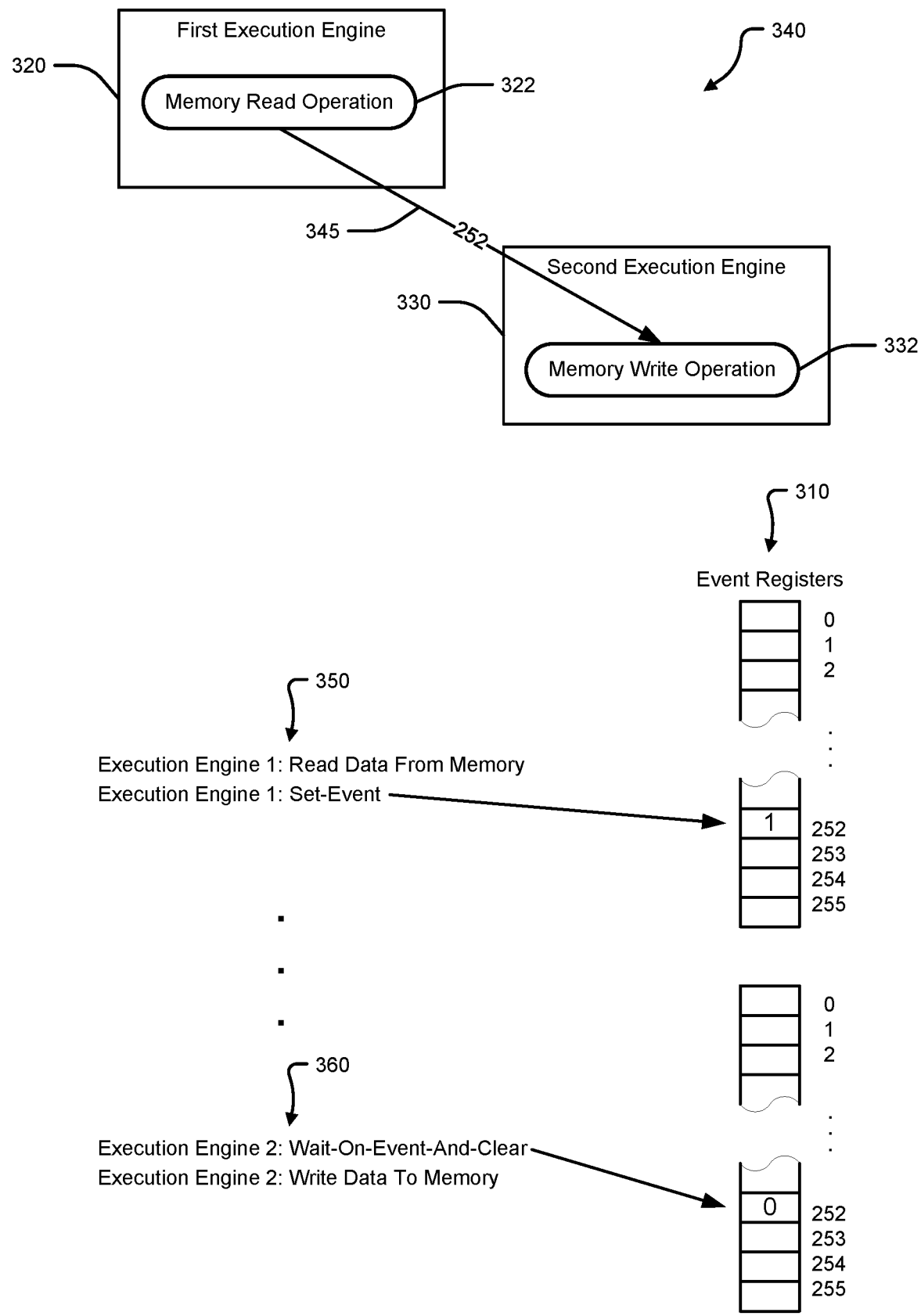
FIG. 3 illustrates a diagram showing an example of setting and clearing an event register.

FIG. 3 illustrates a diagram showing an example of setting and clearing an event register within a set of event registers 310, as may be performed by a procedure that generates instructions for an integrated circuit device. The event registers 310 may contain 256 bits or another number of bits. The event registers 310 may be included in the memory subsystem of the integrated circuit device as separate registers. The event registers 310 may be set and cleared by the set-event and wait-on-event primitives. Referring to FIG. 3, a first execution engine 320 may require data stored in memory. The first execution engine 320 may execute a read operation 322 to read the data from memory. At the same time, a second execution engine 330 may need to perform a write operation 332 to write data to memory. Due to limited resources, the second execution engine 330 may need the memory space containing the data required by the first execution engine 320 in order to perform the write operation 332. Therefore, the read operation 322 for the first execution engine 320 must complete to free up the memory locations occupied by its data before the second execution engine 330 can perform the write operation 332 to the memory locations previously containing the data for first execution engine 320. The dataflow graph 340 illustrates this dependency as edge 345.

The instruction generation procedure may assign an event register (e.g., the event register at location 252) to the edge 345 indicating the dependency between the read operation 322 for the first execution engine 320 and the write operation 332 for the second execution engine 330. When instructions are generated from the dataflow graph, the instruction generation procedure may cause the compiler to insert a set-event instruction (e.g., "set-event") in the code 350 generated for the first execution engine 320, after the read operation 322. The set-event instruction, when executed, may cause the bit at indexed location 252 to be set in the event registers 310.

The instruction generation procedure may also cause the compiler to insert a wait-on-event instruction (e.g., "wait-on-event-and-clear") in the code 360 generated for the second execution engine 330, before the write operation 332. The wait-on-event instruction, when executed, may cause the second execution engine 330 to wait for the first execution engine 320 to reach the set-event instruction, which the first execution engine 320 will execute after completing the read operation 322. The wait-on-event instruction, when executed by the second execution engine 330, may also cause the bit at the indexed location 252 in the event registers 310 to be cleared. Thus, synchronization between the first execution engine 320 and the second execution engine 330 may be achieved.

In the preceding example, use of the bit at the indexed location 252 in the event registers is used as an example, with the understanding that any bit in the event registers may be assigned to a dependency in the dataflow graph. In addition, the use of the read/write operation is one example of a dependency that can occur, and that other types of dependencies can occur.

In various examples, a fixed size array may be used to track available events. Each index of the fixed-size array can correspond to an event register of the integrated circuit. Values stored in the fixed-sized array can indicate whether a respective event register is available to be set by the set-event instruction. For example, when a particular event register is set by execution of a "set-event" instruction, a corresponding value in the fixed size array may be set to a value (e.g., a value of "1") indicating that the particular event register is no longer available to be set. When the particular event register is cleared, for example by a "wait-for-event" instruction corresponding to the "set-event" instruction, the corresponding value in the fixed size array may be set to a different value of (e.g., a value of "0") indicating that the particular event register is again available to be set.

Certain edges of a dataflow graph may not require event registers for synchronization. For example, referring again to FIG. 2, the edge 122 from the second computation operation (the operation 120 in the first execution engine 210 to the operation 150 in the first execution engine 210 may not have an assigned event register because both operations are executed on the same engine (i.e., the first execution engine 210). Likewise, the edge 142 from the operation 140 in the second execution engine 220 to the operation 110 in the second execution engine 220 may not have an assigned event because both operators are executed on the same engine (i.e., the second execution engine 220).

The instruction generation procedure may handle an arbitrary number of input or output edges. The only restriction on the dataflow graph is that it does not contain directed cycles; that is, repetitions of operations and edges in the sequences of the graph (e.g., loops in the graph). A directed cycle can result in a deadlock condition, where, for example, a first execution engine is waiting on an event register to be set by a second execution engine, which is in turn waiting for an event register to be set by the first execution engine. When the number of edges requiring an event assignment in the dataflow graph is less than or equal to the number of event registers available (e.g., 256 event registers), each edge requiring an event register assignment in the dataflow graph may be assigned a different event register, and such assignments would be proper.

For very large data flow graphs, the number of edges requiring an event register assignment may be much larger than the number of event registers available; therefore, event registers may be reused. Event registers that are cleared by wait-on-event instructions may be reused for subsequent events. Reusing event registers incorrectly may introduce race conditions that could cause incorrect behavior.

In one example, incorrect behavior can result when there is double setting or double clearing of an event register. Double setting of an event register occurs when two or more set-event register instructions set a particular event register without each having a corresponding wait-on-event instruction. Double setting can result in ambiguity as to which set-event is supposed to trigger the wait-on-event, such that the instructions triggered by the wait-on-event being satisfied may not execute correctly. Double clearing of an event register occurs when an event register is cleared (e.g., by a wait-on-event instruction, an explicit clear-event instruction, or another instruction) at least twice without having been set in between. Double clearing indicates that a set-event instruction may be missing, or that a wait-on-event instruction may be missing, or both, and that the operations of two or more execution engines may not be properly synchronized.

In another example, incorrect behavior can occur when two or more execution engines wait on the same event register. If two execution engines wait on the same event register, one execution engine may clear the event register (e.g., by execution of the wait-on-event instruction) before the other execution engine starts waiting for the event register. In such case, the latter execution engine may become deadlocked; that is, the event may not occur again, and the execution engine may not be able to complete execution of its instructions.

Figure 4:
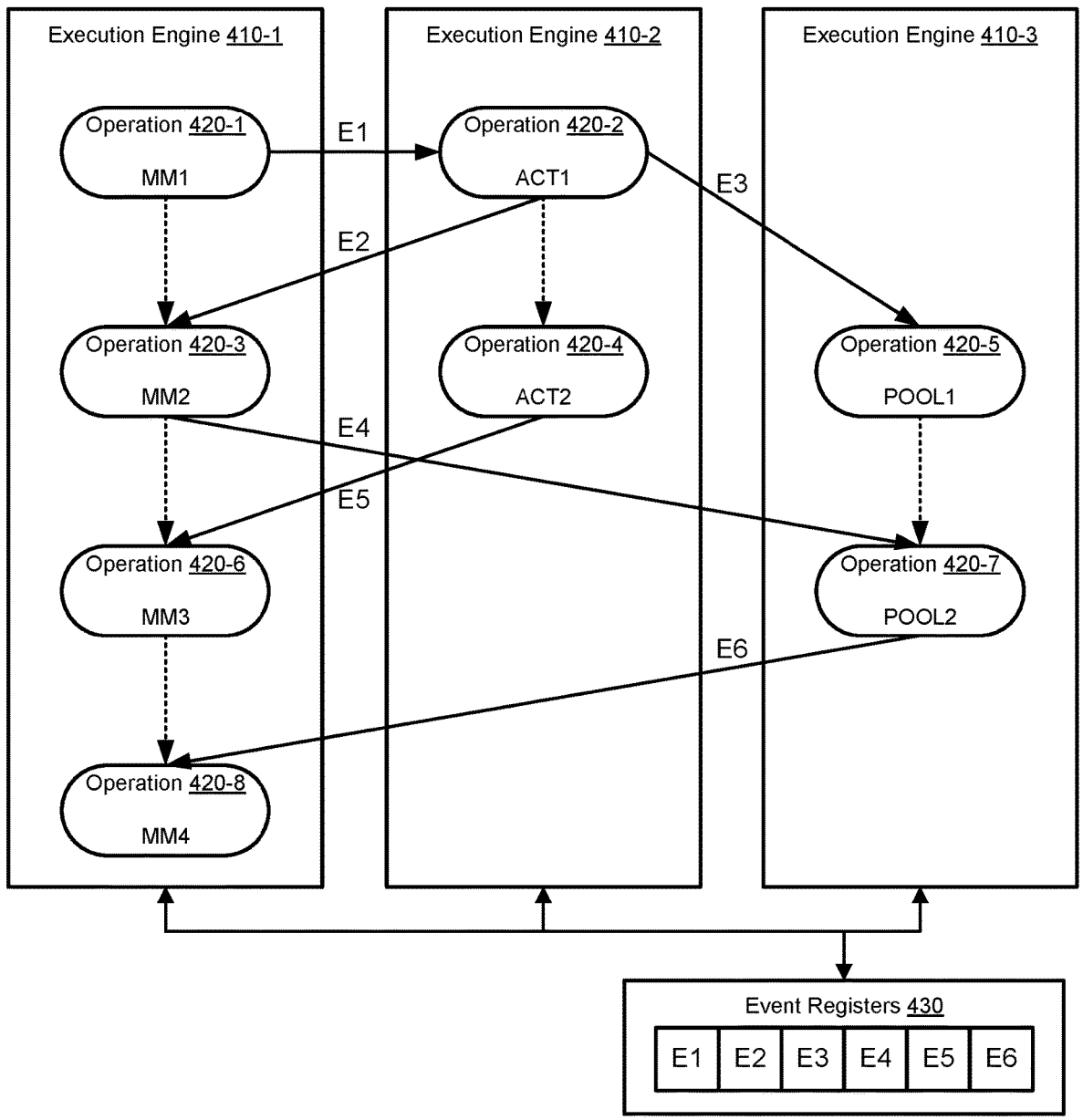
FIG. 4 illustrates a diagram showing an example of assigning event registers to edges between operations.

FIG. 4 illustrates a diagram showing an example of assigning event registers 430 to edges between operations 420. The operation type for each of the operations 420 is indicated either by the abbreviation "MM" (matrix multiplication), "ACT" (activation), or "POOL" (pooling). In the example shown in FIG. 4, the number of event registers in the event registers 430 is equal to the number of edges between the operations 420 that are performed by different execution engines 410 (i.e., the number of cross-engine edges). Accordingly, the compiler may assign the event registers 430 to the edges without reusing any of the event registers 430. Specifically, the event register E1 may be assigned to the edge between the operations 420-1 and 420-2, the event register E2 may be assigned to the edge between the operations 420-2 and 420-3, the event register E3 may be assigned to the edge between the operations 420-2 and 420-5, the event register E4 may be assigned to the edge between the operations 420-3 and 420-7, the event register E5 may be assigned to the edge between the operations 420-4 and 420-6, and the event register E6 may be assigned to the edge between the operations 420-7 and 420-8.

Figure 5:
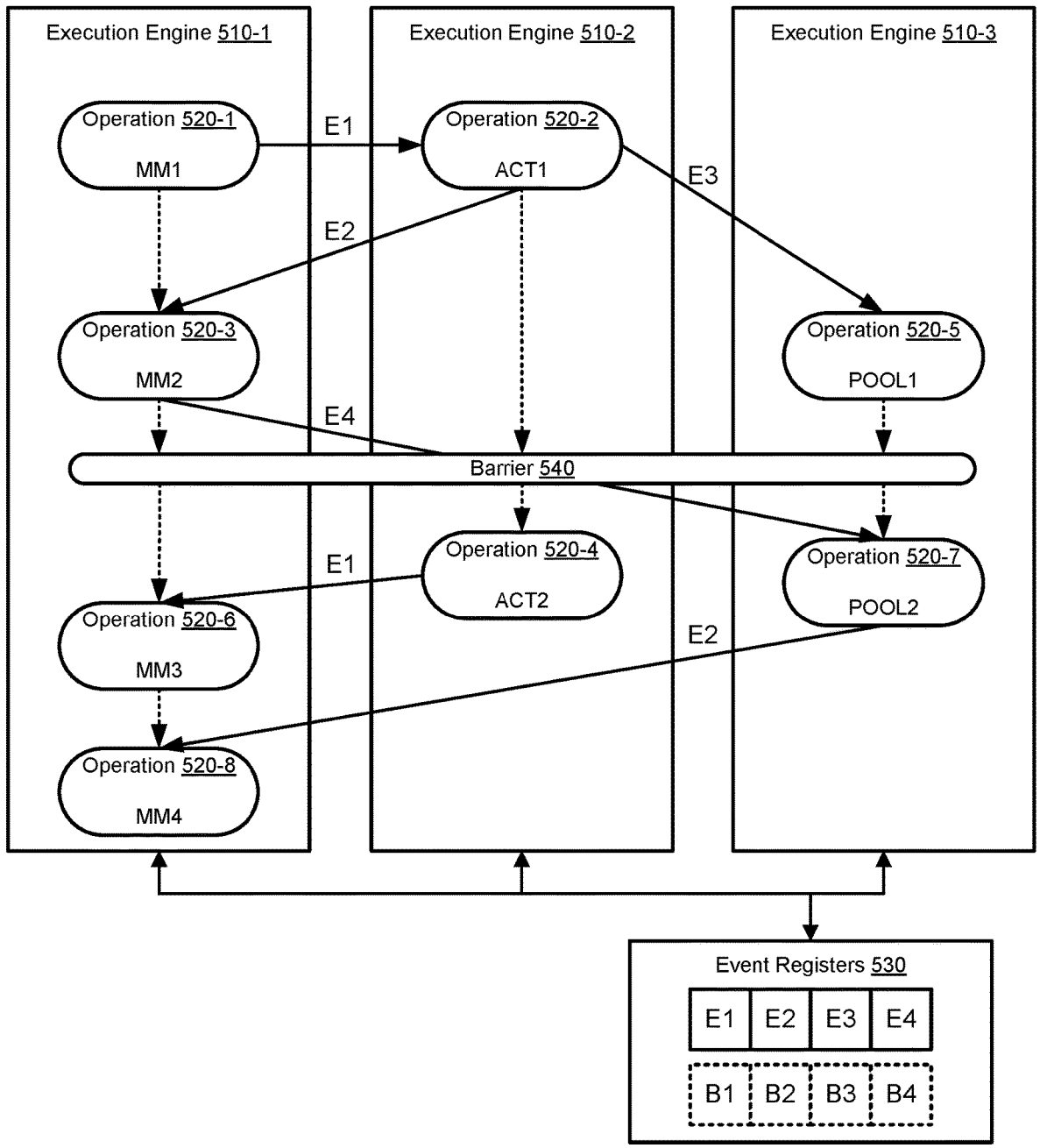
FIG. 5 illustrates a diagram showing an example of assigning event registers to edges between operations.

FIG. 5 illustrates a diagram showing an example of assigning event registers 530 to edges between operations 520. In the example shown in FIG. 5, the number of event registers (E1-E4) in the event registers 530 is less than the number of edges between the operations 520 that are performed by different execution engines 510 (the number of cross-engine edges). Accordingly, one solution is to introduce a barrier 540 which allows synchronization of the execution engines 510. After the barrier 540, events set and cleared before the barrier 540 can be reused. For example, the event register E1 may be reused and assigned to the edge between the operations 420-4 and 420-6, and the event register E2 may be reused and assigned to the edge between the operations 420-7 and 420-8.

In one particular implementation, to implement the barrier 540 for the three execution engines 510, five additional NOP nodes and four additional edges between the new nodes are added. To synchronize the barrier edges, four event registers B1-B4 may be reserved for the barrier 540 as well as additional barriers that are used later. While the barrier 540 may need the use of additional event registers and additional NOP nodes, the main cost of the barrier 540 is the delay between engines while waiting for all of the execution engines 510 to reach the barrier 540.

Figure 6:
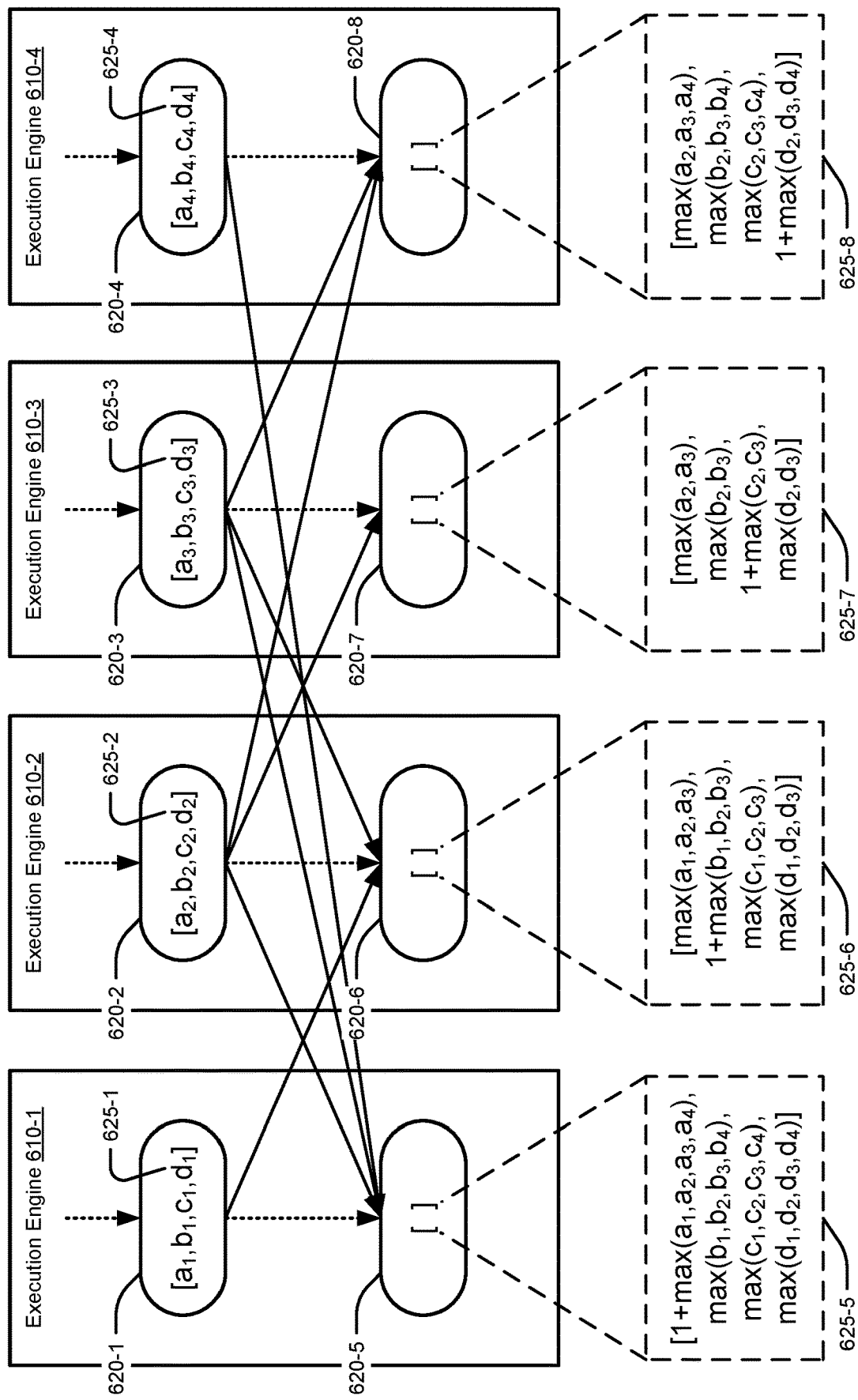
FIG. 6 illustrates a diagram showing a technique for generating dependency vectors for operations that can be used to assign event registers to the operations.

FIG. 6 illustrates a diagram showing a technique for generating dependency vectors 625 for operations 620 that can be used to assign event registers to the operations 620. The dependency vectors 625 each comprise a set of N values that are calculated based on (1) which of the execution engines 610 performs the corresponding operation and/or (2) the set of N values of the dependency vectors 625 of immediately preceding operations, i.e., the operations that are directly connected to the corresponding operation through an edge. The value of N is equal to the number of execution engines 610, which in the example illustrated in FIG. 6 is four.

The dependency vectors 625-1 to 625-4 generated for the operations 620-1 to 620-4 are shown symbolically in FIG. 6 as values $[a_1, b_1, c_1, d_1]$ for the dependency vector 625-1, $[a_2, b_2, c_2, d_2]$ for the dependency vector 625-2, $[a_3, b_3, c_3, d_3]$ for the dependency vector 625-3, and $[a_4, b_4, c_4, d_4]$ for the dependency vector 625-4. The values of the dependency vector 625-5 are calculated based on the dependency vectors 625-1 to 625-4 and based on the operator 620-5 being executed by the first execution engine 610-1. Specifically, the first value of the dependency vector 625-5 is calculated as the maximum value of the first values of the dependency vectors 625-1 to 625-4 for the operations 620-1 to 620-4 that immediately precede the operation 620-5. Furthermore, because the first execution engine 610-1 performs the operation 620-5, the first value of the dependency vector 625-5 is incremented by one. The second, third, and fourth values of the dependency vector 625-5 are calculated as the maximum values of the first, second, and third values of the dependency vectors 625-1 to 625-4, respectively, but are not incremented by one like the first value of the dependency vector 625-5.

The values of the dependency vector 625-6 are calculated based on the dependency vectors 625-1 to 625-3 and based on the operator 620-6 being executed by the second execution engine 610-2. Specifically, the second value of the dependency vector 625-6 is calculated as the maximum value of the second values of the dependency vectors 625-1 to 625-3 for the operations 620-1 to 620-3 that immediately precede the operation 620-6. Furthermore, because the second execution engine 610-2 performs the operation 620-6, the second value of the dependency vector 625-6 is incremented by one. The first, third, and fourth values of the dependency vector 625-6 are calculated as the maximum values of the first, third, and fourth values of the dependency vectors 625-1 to 625-3, respectively, but are not incremented by one like the second value of the dependency vector 625-6.

The values of the dependency vector 625-7 are calculated based on the dependency vectors 625-2 and 625-3 and based on the operator 620-7 being executed by the third execution engine 610-3. Specifically, the third value of the dependency vector 625-7 is calculated as the maximum value of the third values of the dependency vectors 625-2 and 625-3 for the operations 620-2 and 620-3 that immediately precede the operation 620-7. Furthermore, because the third execution engine 610-3 performs the operation 620-7, the third value of the dependency vector 625-7 is incremented by one. The first, second, and fourth values of the dependency vector 625-7 are calculated as the maximum values of the first, second, and fourth values of the dependency vectors 625-2 and 625-3, respectively, but are not incremented by one like the third value of the dependency vector 625-7.

The values of the dependency vector 625-8 are calculated based on the dependency vectors 625-2 to 625-4 and based on the operator 620-8 being executed by the fourth execution engine 610-4. Specifically, the fourth value of the dependency vector 625-8 is calculated as the maximum value of the fourth values of the dependency vectors 625-2 to 625-4 for the operations 620-2 to 620-4 that immediately precede the operation 620-8. Furthermore, because the fourth execution engine 610-4 performs the operation 620-8, the fourth value of the dependency vector 625-8 is incremented by one. The first, second, and third values of the dependency vector 625-8 are calculated as the maximum values of the first, second, and third values of the dependency vectors 625-1 to 625-3, respectively, but are not incremented by one like the fourth value of the dependency vector 625-8.

Figure 7:
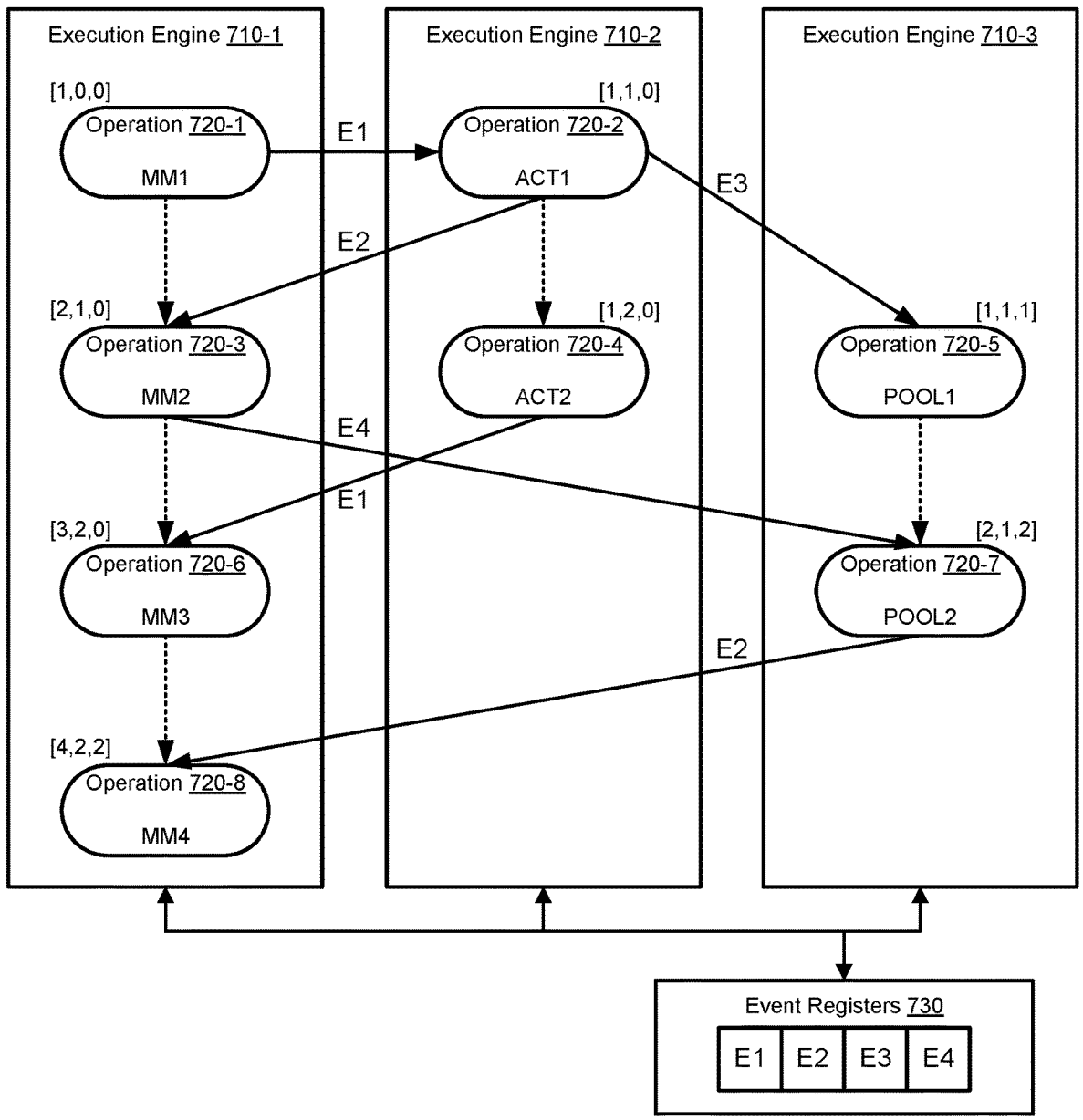
FIG. 7 illustrates a diagram showing an example of assigning event registers to edges between operations based on dependency vectors.

FIG. 7 illustrates a diagram showing an example of assigning event registers 730 to edges between operations 720 based on dependency vectors, which are shown in brackets above each operation. In the example shown in FIG. 7, the number of event registers in the event registers 730 is less than the number of edges between the operations 720 that are performed by different execution engines 710 (the number of cross-engine edges). Accordingly, reuse of event registers may be employed.

Prior to assigning event registers 730 to edges, the dependency vectors shown are generated for each of the operations 720, in accordance with the technique described in reference to FIG. 6. The dependency vectors allow the compiler to quickly determine a relationship between two operations, which is used to determine whether an event register can be reused. For example, a first operation is considered to follow a second operation (the second operation is considered to precede the first operation) if each value of the dependency vector for the first operation is greater than or equal to each corresponding value of the second operation. Alternatively, the second operation is considered to follow the first operation (the first operation is considered to precede the second operation) if each value of the dependency vector for the second operation is greater than or equal to each corresponding value of the first operation. If neither of the above are true, then the operations can be performed in either order.

In the illustrated example, the event register E1 is assigned to the edge between the operations 720-1 and 720-2. The compiler may record this assignment, and may also record the dependency vector of the end operation ([1,1,0]) and optionally the start operation ([1,0,0]) associated with the edge to which the event register E1 is assigned. Continuing with this example, the event registers E2-E4 may be assigned to the edges between the operations 720-2 and 720-3, the operations 720-2 and 720-5, and the operations 720-3 and 720-7, respectively, and the dependency vectors of the end operations ([2,1,0], [1,1,1], and [2,1,2]) and optionally the start operations ([1,1,0], [1,1,0], [2,1,0]) are recorded.

For assignment of an event register to the edge between the operations 720-4 and 720-6, the compiler may determine whether any of the event registers E1-E4 can be reused. The compiler may first determine whether the event register E1 can be reused by determining whether the start operation associated with the new edge (the operation 720-4) follows the end operation associated with the previous edge (the operation 720-2). This is accomplished by comparing the dependency vector for the start operation associated with the new edge ([1,2,0]) with the dependency vector for the end operation associated with the previous edge ([1,1,0]). Because each value of [1,2,0] is greater than or equal to each corresponding value of [1,1,0], it may be determined that the start operation associated with the new edge follows the end operation associated with the previous edge, and therefore the event register E1 may be reused with the new edge.

In some embodiments, an additional constraint is placed on event register reuse by determining whether a same-engine predecessor operation that immediately precedes the end operation associated with the new edge (the operation 720-3) follows the end operation associated with the previous edge (the operation 720-2). This is accomplished by comparing the dependency vector for the same-engine predecessor operation associated with the new edge ([2,1,0]) with the dependency vector for the end operation associated with the previous edge ([1,1,0]). Because each value of [2,1,0] is greater than or equal to each corresponding value of [1,1,0], it may be determined that the same-engine predecessor operation associated with the new edge follows the end operation associated with the previous edge, and therefore the event register E1 may be reused with the new edge.

Had the event register E1 not been available for reuse for the edge between the operations 720-4 and 720-6, then the above-described process would be repeated for each of the event registers E2-E4 until an available event register could be found. After an event register is assigned to the edge between the operations 720-4 and 720-6, the compiler next attempts to assign an event register to the edge between the operations 720-7 and 720-8.

For assignment of an event register to the edge between the operations 720-7 and 720-8, the compiler may determine whether the event register E2 can be reused by determining whether the start operation associated with the new edge (the operation 720-7) follows the end operation associated with the previous edge (the operation 720-3). This is accomplished by comparing the dependency vector for the start operation associated with the new edge ([2,1,2]) with the dependency vector for the end operation associated with the previous edge ([2,1,0]). Because each value of [2,1,2] is greater than or equal to each corresponding value of [2,1,0], it may be determined that the start operation associated with the new edge follows the end operation associated with the previous edge, and therefore the event register E2 may be reused with the new edge.

As described above, an additional constraint may be placed on event register reuse by determining whether a same-engine predecessor operation that immediately precedes the end operation associated with the new edge (the operation 720-6) follows the end operation associated with the previous edge (the operation 720-3). This is accomplished by comparing the dependency vector for the same-engine predecessor operation associated with the new edge ([3,2,0]) with the dependency vector for the end operation associated with the previous edge ([2,1,0]). Because each value of [3,2,0] is greater than or equal to each corresponding value of [2,1,0], it may be determined that the same-engine predecessor operation associated with the new edge follows the end operation associated with the previous edge, and therefore the event register E2 may be reused with the new edge.

Once all of the cross-engine edges have been assigned event registers, the compiler may record a sequence for each of the event registers 730. In the illustrated example, for the event register E1, the compiler may record a sequence indicating that the event register E1 is set by the operation 720-1, then cleared by the operation 720-2, then set by the operation 720-4, and then cleared by the operation 720-6. For the event register E2, the compiler may record a sequence indicating that the event register E2 is set by the operation 720-2, then cleared by the operation 720-3, then set by the operation 720-7, and then cleared by the operation 720-8.

Figure 8:
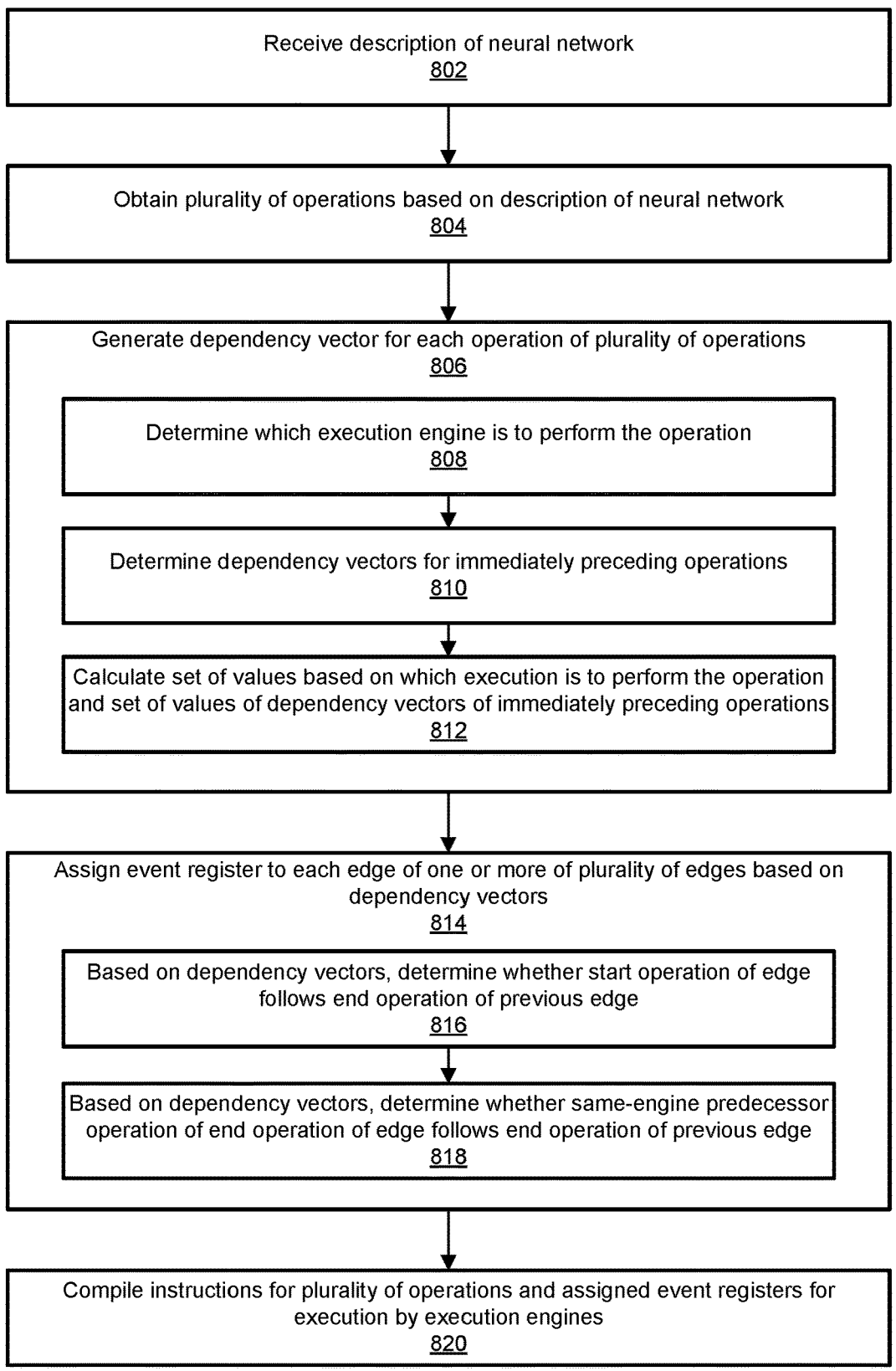
FIG. 8 includes a flowchart illustrating an example of a method for assigning event registers to edges between operations.

FIG. 8 includes a flowchart illustrating an example of a method 800 for assigning event registers to edges between operations. One or more steps of the method 800 may be performed in a different order than the illustrated example, and one or more steps of the method 800 may be omitted during the performance of the method 800. One or more steps of the method 800 may be performed by a compiler running on a host processor.

At step 802, a description of the neural network is received. In some embodiments, the description of the neural network is received by a compiler.

At step 804, a plurality of operations are obtained. In some embodiments, the plurality of operations are obtained based on the description of the neural network. In some embodiments, the plurality of operations are obtained by the compiler. In some embodiments, the plurality of operations are connected through a plurality of edges. In some embodiments, each of the plurality of operations is to be performed by one of multiple execution engines. In some embodiments, the multiple execution engines may include N execution engines.

At step 806, a dependency vector is generated for each operation of the plurality of operations. In some embodiments, the dependency vector is generated by the compiler. In some embodiments, the dependency vector of a corresponding operation includes a set of values. In some embodiments, the set of values includes N values. In some embodiments, the set of values are calculated based on which execution engine of the multiple execution engines is to perform the corresponding operation and/or the set of values of one or more dependency vectors calculated for one or more immediately preceding operations of the plurality of operations. In some embodiments, step 806 includes one or more of steps 808, 810, and 812.

At step 808, it is determined which execution engine of the multiple execution engines is to perform the corresponding operation. In some embodiments, the compiler determines which execution engine is to perform the corresponding operation.

At step 810, the set of values of one or more dependency vectors for one or more immediately preceding operations of the plurality of operations are determined. In some embodiments, the compiler determines the set of values of the one or more dependency vectors for the one or more immediately preceding operations. In some embodiments, the immediately preceding operations are the operations that are directly connected to the corresponding operation through an edge, such that the corresponding operation is the end operation and the immediately preceding operations are the start operations for respective edges.

At step 812, the set of values for the dependency vector are calculated based on which execution engine is to perform the corresponding operation and/or the set of values of the one or more dependency vectors for the one or more immediately preceding operations. In some embodiments, the set of values are calculated by the compiler.

At step 814, an event register of the plurality of event registers is assigned to each edge of one or more of the plurality of edges based on the dependency vectors. In some embodiments, the event register is assigned by the compiler. In some embodiments, the event register is assigned to the corresponding edge based on the dependency vector generated for a start operation associated with the corresponding edge. In some embodiments, if the event register was previously assigned to a previous edge of the plurality of edges, the event register is assigned to the corresponding edge based on the dependency vector generated for an end operation associated with the previous edge. In some embodiments, the event register is assigned to the corresponding edge based on the dependency vector generated for a same-engine predecessor operation that immediately precedes an end operation associated with the corresponding edge.

At step 816, it is determined whether the start operation associated with the corresponding edge follows the end operation associated with the previous edge. In some embodiments, the compiler makes this determination. In some embodiments, it is determined whether each value of the dependency vector generated for the start operation associated with the corresponding edge is greater than or equal to each corresponding value of the dependency vector generated for the end operation associated with the previous edge.

At step 818, it is determined whether the same-engine predecessor operation that immediately precedes the end operation associated with the corresponding edge follows the end operation associated with the previous edge. In some embodiments, the compiler makes this determination. In some embodiments, it is determined whether each value of the dependency vector generated for the same-engine predecessor operation that immediately precedes the end operation associated with the corresponding edge is greater than or equal to each corresponding value of the dependency vector generated for the end operation associated with the previous edge At step 820, the compiler compiles instructions for the plurality of operations and the assigned event registers for execution by the multiple execution engines.

Figure 9:
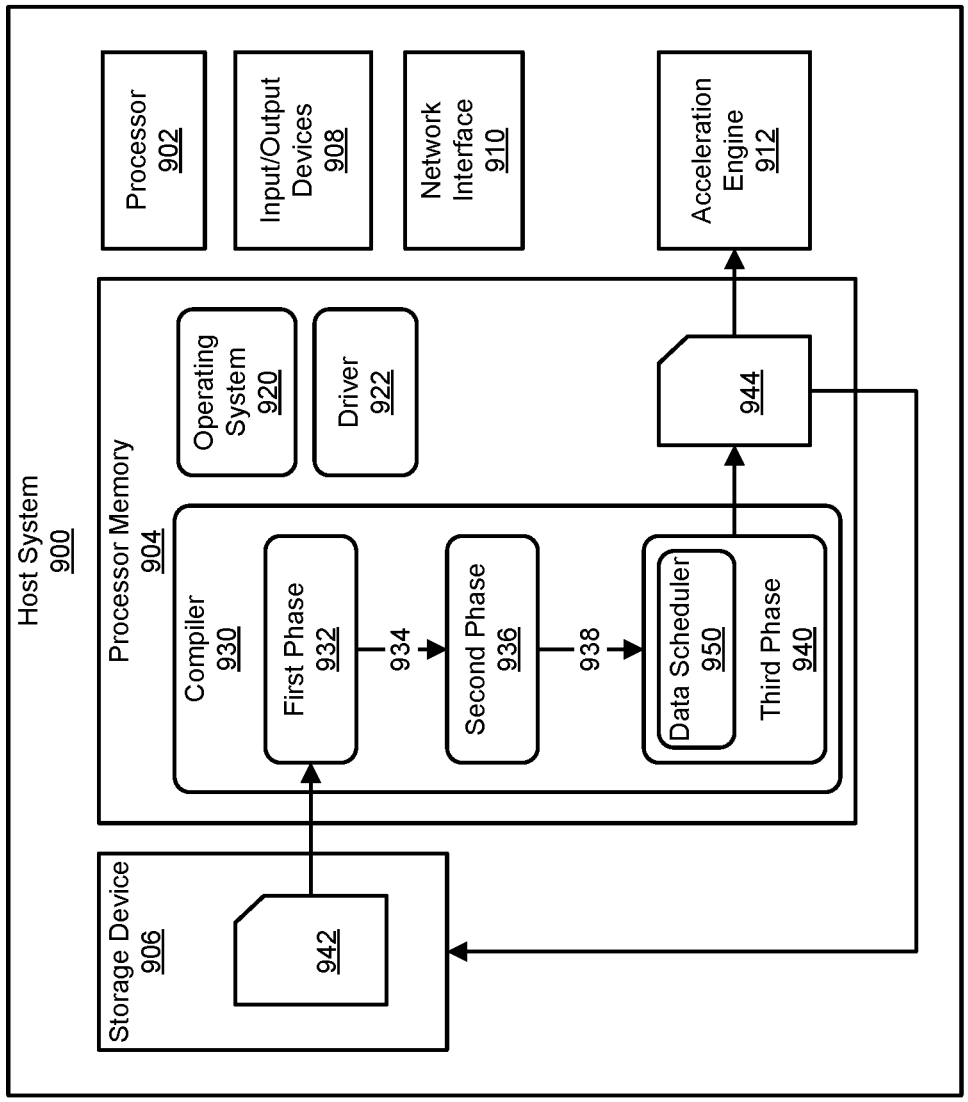
FIG. 9 includes a block diagram that illustrates an example of a host system.

FIG. 9 includes a block diagram illustrating an example of a host system 900 on which a compiler, such as is described herein, can run. The illustrated host system 900 is an example of a computing device, and includes a processor 902, a processor memory 904, at least one storage device 906, various Input/Output (I/O) devices 908, and at least one network interface 910. In the example of FIG. 9, the host system 900 also includes an acceleration engine 912, which is an integrated circuit device that can accelerate certain operations or computations performed by the host system 900. In various examples, the host system 900 can be implemented as a server in a data center, a desktop computer, a laptop computer, a tablet computer, or a smartphone, among other examples. In some examples, operations or components discussed below as performed or included in the host system 900 can be performed or included in other computer devices. For example, the compiler 930 can execute on the host system 900 while the acceleration engine 912 is located at a different host system.

The processor 902 is an integrated circuit device that can execute program code, in the form of instructions. The program code can be used for various software applications or tools, such as an operating system 920 or the compiler 930. While the processor 902 is executing a program, the instructions for the program can be stored in the processor memory 904. The instructions can also be stored elsewhere, such as on the storage device 906, and can be loaded into the processor memory 904 when needed by the processor 902. The processor 902 can also use the processor memory 904 for temporary storage of other data on which the processor 902 is operating. In various examples, the processor memory 904 is a volatile memory type, such as a type of Random Access Memory, though non-volatile memory types can, alternatively or additionally, be used for the processor memory 904.

The storage device 906 is an example of a device that can include non-volatile memory. For example, the storage device 906 can be a magnetic disk drive, a solid state drive, or an optical drive, among other examples. The storage device 906 can further be non-transitory, such that program code and other data stored on the storage device 906 remains present when the storage device 906 is not powered on.

The storage device 906 is one example of a peripheral device, which are components that can be coupled to the host system 900 to add functionality to the host system 900. Other examples of peripheral devices include the Input/Output devices 908 and the network interface 910. The Input/Output devices 908 can include user input and output devices, such as keyboards, mice, touch screens, microphones, display screens, speakers, printers, and scanners, among other examples. The network interface 910, which can be implemented using a network interface card, can provide access to one or more networks. The network interface 910 can include, for example, a physical port for connecting a network cable and/or wireless antennas for communicating with Wi-Fi and/or cellular networks. The network interface 910 can also be described as an I/O device.

The acceleration engine 912 is also another type of peripheral device or I/O device. The acceleration engine 912 is a device that is purpose built to perform certain operations that can be performed by the processor 902, but can be performed faster by the acceleration engine 912. For example, the acceleration engine 912 can be a neural network accelerator, and, as such, may be able to perform the large scale, parallel computations of a neural network more efficiently than when the computations are performed by the processor 902. As another example, the acceleration engine 912 can be a GPU, and may be optimized to perform the computations needed for graphics rendering. Other examples of devices that can be implemented by the acceleration engine 912 include cryptographic accelerators, compression and decompression accelerators, 3-D accelerators, regular expression accelerators, security accelerators, and others.

In various examples, the acceleration engine 912 can execute program code to perform certain operations. For example, when the acceleration engine 912 is a neural network accelerator, the acceleration engine 912 can be programmed to execute a particular neural network, such as one that performs image recognition or one that performs machine translation. As a further example, to support the execution of a neural network, the acceleration engine 912 can be programed to perform operations such as copying data for the neural network from processor memory 904 (for example) into the acceleration engine 912, copying input data for the neural network from processor memory 904 into the acceleration engine 912, and/or copying results from the acceleration engine 912 into the processor memory 904, among other examples.

To generate program code for the acceleration engine 912, in various examples, the host system 900 can execute the compiler 930. Compilers, in general, are software programs that translate program code written in a human-readable language into a format (e.g., machine instructions) that can be read and processed by an integrated circuit device. In the example of FIG. 9, the acceleration engine 912 is a neural network accelerator and the compiler 930 is for compiling a neural network description into instructions to be executed on the acceleration engine 912. When the acceleration engine 912 implements a different type of accelerator, another compiler can be used.

The compiler 930 can be activated, for example, when the operating system 920 receives keyboard, mouse, touchscreen, voice commands, or other inputs from the Input/Output devices 908. The inputs can further include parameters for the compiler 930, such as the input code 942 to compile and configuration options for the compilation process. Once the compiler 930 is activated, the processor 902 can load the instructions for the compiler 930 into the processor memory 904, and can execute the instructions.

In the example of FIG. 9, the compiler 930 includes a first stage 932, a second stage 936, and a third stage 940, which each perform different operations to produce compiled code 944. In other examples, the compiler 930 can combine the operations of the first stage 932, second stage 936, and/or third stage 940 into fewer stages, or can divide the operations of one of the stages into multiple stages.

The first stage 932 can receive and process input code 942. The input code 942 can describe a program in a high-level programming language, such as Java, C++, or Tensorflow, among many other examples. The input code 942 can describe, for example, steps to perform image recognition, speech recognition, machine translation, or other operations. The input code 942 can be obtained, for example, from the storage device 906. Alternatively, though not illustrated here, the input code 942 may be located in the processor memory 904 or can be obtained from a network location, using the network interface 910. Processing of the input code 942 can include sorting the operations described in the input code 942 into layers, where the outputs of one layer provide the inputs to a next layer. Processing can also include identifying steps to be performed by the processor 902, rather than by the acceleration engine 912. For example, the processor 902, through the execution of a driver 922, may need to perform steps such as configuring Direct Memory Access (DMA) descriptors for moving data into or out of the acceleration engine 912, among other examples.

The output 934 of the first stage 932 can be organized, for example, in the layers, nodes, and connections between nodes of a neural network. The second stage 936 can perform intermediate processing on this output 934. For example, the operations performed in any one layer, or at any one node in a layer, may be too many for the acceleration engine 912 to perform at the same time. The acceleration engine 912 may, for example, have a limited amount of local storage space for the data needed for a computation, or the computations may be more than the acceleration engine 912 can perform at one time. In this example, the first stage 932 can break the operations of the layer or node down into smaller operations, which can fit into the acceleration engine's local memory and/or can fit into the computing capacity of the acceleration engine 912. Processing of the output 934 of the first stage 932 can include other steps, such as scheduling, or determining the order in which the acceleration engine 912 and/or processor 902 will perform operations, among other examples.

In various examples, the output 938 of the second stage 936 includes the various steps to be performed by components of the acceleration engine 912, in the order that the steps are to be performed. The output 938 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 940 can operate on the output 938 of the second stage 936, and perform various steps before producing the instructions that are to be executed by the acceleration engine 912. These steps can include, for example, removing redundant dependencies, resolving or handling dependencies between nodes by inserting synchronization instructions into the code, identifying possible optimizations in memory usage or memory bandwidth usage, and other operations.

The output of the third stage 940 is compiled code 944, which may include machine instructions in binary format. In some examples, the compiled code 944 can be stored in the processor memory 904. Alternatively or additionally, the compiled code 944 can be copied to the storage device 906 or to a network location. As noted above, the acceleration engine 912 may be located at a different host system, in which case the compiled code 944 can be sent over the network interface 910 to the other host system.

In the example of FIG. 9, the host system 900 can execute a driver 922, which can also be referred to as a device driver or runtime driver, that manages the acceleration engine 912. The driver 922 can provide an interface between applications executing on the host system 900 (or on another host system) and the acceleration engine 912. For example, the driver 922 can provide an Application Program Interface (API) that defines functions for feeding input data to the acceleration engine 912 and defining the operation to perform on the input data. In this and other examples, the driver 922 can configure the acceleration engine 912 to perform the operation. For example, the driver 922 can identify a neural network that the acceleration engine 912 is to execute, as well as the location in the processor memory 904 or on the storage device 906 where the compiled code 944 for the neural network is located. The driver 922 can further load into the acceleration engine 912 or cause the acceleration engine 912 to load the compiled code 944, can load or cause the acceleration engine 912 to load the input data on which the neural network is to operate, and/or can cause the acceleration engine 912 to begin executing on the input data. Once the acceleration engine 912 has finished, the acceleration engine 912 can notify the driver 922, and the driver 922 can deliver a result back to the application that requested the result.

Figure 10:
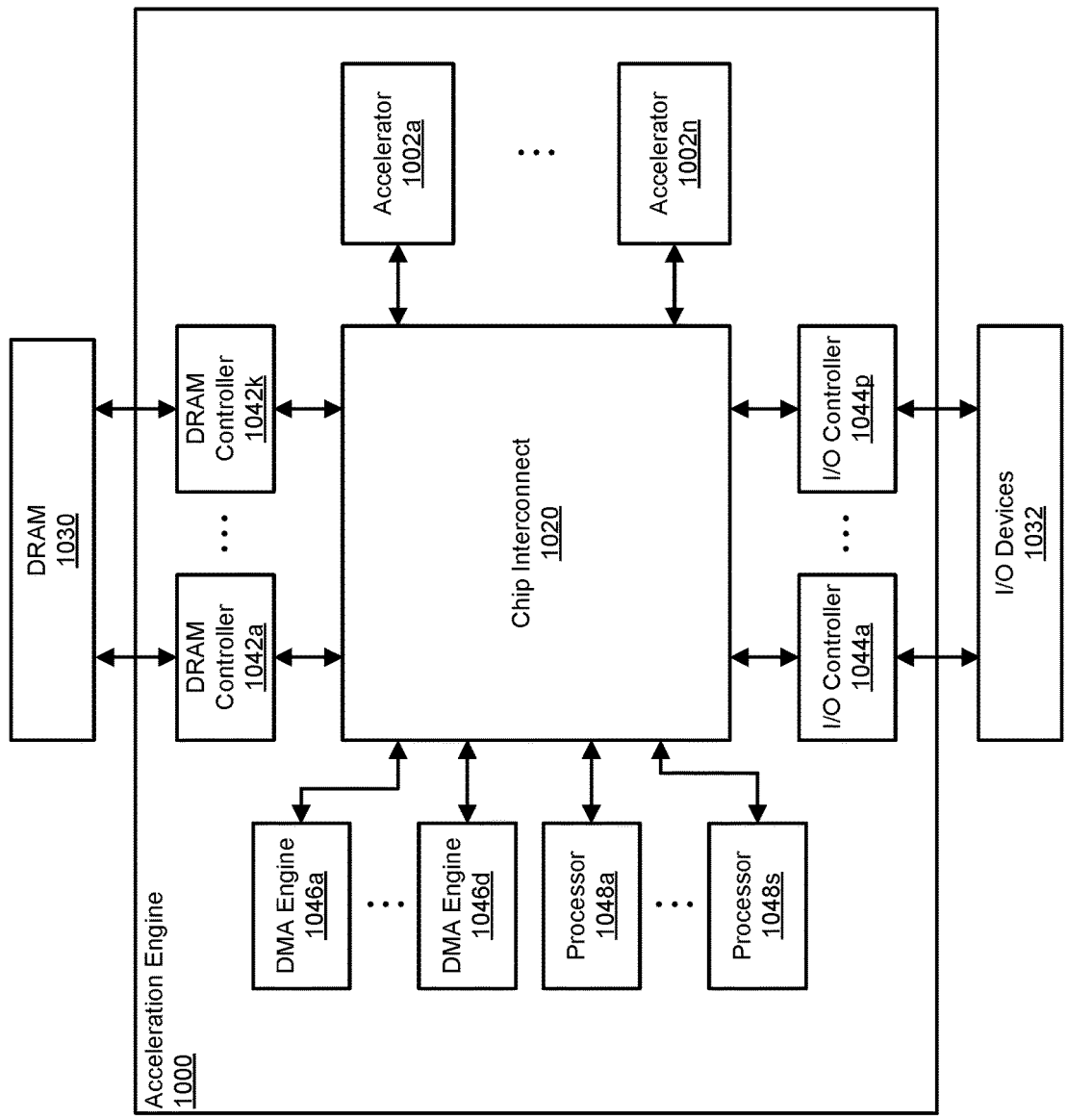
FIG. 10 includes a block diagram that illustrates an example of an acceleration engine.

FIG. 10 includes a block diagram that illustrates an example of an acceleration engine 1000. The acceleration engine 1000 is an example of an integrated circuit that can include one or more accelerators 1002a-1002n that may be similar to the accelerator illustrated in FIG. 11.

In the example of FIG. 10, the acceleration engine 1000 includes multiple accelerators 1002a-1002n, each of which can perform a set of operations. In various examples, the accelerators 1002a-1002n are for particular types of operations, so that the accelerators 1002a-1002n can perform the operations much faster than when similar operations are performed by a general purpose processor. In various examples, to perform a set of operations, input data on which the operations are to be performed must first be moved into the accelerators 1002a-1002n. Additionally, in some cases, program code is also moved into the accelerators 1002a-1002n, which programs the operations that the accelerators 1002a-1002n will perform on the data. In the illustrated example, the acceleration engine 1000 includes n accelerators 1002a-1002n. Examples of accelerators that can be included in the acceleration engine 1000 include graphics accelerators, floating point accelerators, neural network accelerators, and others. In various examples, the accelerators 1002a-1002n can each be the same (e.g., each of the is a graphics accelerator) or can be different (e.g., the accelerators 1002a-1002n include a graphics accelerator, a floating point accelerator, and neural network accelerator).

The example acceleration engine 1000 further includes DRAM controllers 1042a-1042k for communicating with an external memory. The external memory is implemented, in this example, using DRAM 1030. In the illustrated example, the acceleration engine 1000 includes k DRAM controllers 1042a-1042k, each of which may be able to communicate with an independent set of banks of DRAM. In other examples, other types of RAM technology can be used for the external memory. The DRAM controllers 1042a-1042k can also be referred to as memory controllers.

In various examples, input data and/or program code for the accelerators 1002a-1002n can be stored in the DRAM 1030. Different programs can cause the accelerators 1002a-1002n to perform different operations. For example, when one of the accelerators is a neural network accelerator, one program can configure the neural network accelerator to perform speech recognition while another program can configure the neural network accelerator to perform image recognition. In various examples, different accelerators 1002a-1002n can be programmed with different programs, so that each performs a different set of operations. In various examples, the processors 1048a-1048s can manage moving of program code from the DRAM 1030 to the accelerators 1002a-1002n.

The example acceleration engine 1000 further includes I/O controllers 1044a-1044p for communicating with I/O devices 1032 in the system. The acceleration engine 1000 can communicate with I/O devices over, for example, a processor bus. In some examples, the processor bus can be implemented using Peripheral Component Interconnect (PCI) and/or a variation of the PCI bus protocol. The processor bus can connect the acceleration engine 1000 to I/O devices such as, for example, input and output devices, memory controllers, storage devices, and/or network interface cards, among other things. In some examples, the I/O controllers 1044-1044p can enable the acceleration engine 1000 to act as an I/O device for a host processor. For example, the acceleration engine 1000 can be the recipient of input data from the host processor, and a command indicating an operation to be performed on the input data (e.g., a particular computation or analysis). In the illustrated example, the acceleration engine 1000 includes p I/O controllers 1044a-1044p, each of which may include a separate root complex and may communicate with a separate set of I/O devices 1032. In other examples, other standardized bus protocols, such as Ultra Path Interconnect (UPI) can be used for the host bus. In other examples, a proprietary bus protocol can be used.

Movement of data in the acceleration engine 1000 can be managed by one or more processors 1048a-1048s, which can also be referred to as data management processors. In the example of FIG. 10, the acceleration engine 1000 includes s processors 1048a-1048s incorporated into the device (e.g., on the same silicon die). In other examples, the processors 1048a-1048s can be external to the acceleration engine 1000 (e.g., on a different die and/or in a different package). In some examples, the processors 1048a-1048s can manage the movement of data from I/O devices 1032 to the accelerators 1002a-1002n or the DRAM 1030. For example, input data may be located at an I/O device 1032 or in processor memory, and the processors 1048a-1048s can move the input from the I/O device 1032 or processor memory into an accelerator or into DRAM 1030. As another example, program code for the accelerators 1002a-1002n may be located on an I/O device 1032 or in processor memory.

The example acceleration engine 1000 further includes DMA engines 1046a-1046d that can move data between the accelerators 1002a-1002n, DRAM controllers 1042a-1042k, and I/O controllers 1044a-1044p. In the illustrated example, the acceleration engine 1000 includes d DMA engines 1046a-1046d. In some implementations, the DMA engines 1046a-1046d can be assigned to specific tasks, such as moving data from the DRAM controllers 1042a-1042d to the accelerators 1002a-1002n, or moving data between the I/O controllers 1044a-1044p and the accelerators 1002a-1002n. These tasks can be assigned, for example, by enqueueing descriptors with the DMA engines 1046a-1046d, where a descriptor identifies an address for a block of data and an operation (e.g., a read or a write) to perform. A descriptor, for example, can direct a DMA engine to instruct a DMA controller to read a block of data from DRAM 1030. A descriptor can, as a further example, instruct the DMA engine to write data, read by the DMA controller, to an accelerator. Further descriptors can be used to move data from an accelerator to DRAM 1030.

In various examples, each of the processors 1048a-1048s can be responsible for managing the data movement for a different accelerator. In some examples, a processor may manage the data movement for more than one accelerator. Similarly, in various examples, each of the processors 1048a-1048s can be assigned to one or more DMA engines 1046a-1046d. In these and other examples, associations between processors 1048a-1048s, accelerators 1002a-1002n, and DMA engines 1046a-1046d are determined by program code being executed by each respective processor.

In the example acceleration engine 1000, the various components can communicate over a chip interconnect 1020. The chip interconnect 1020 primarily includes wiring for routing data between the components of the acceleration engine 1000. In some cases, the chip interconnect 1020 can include a minimal amount of logic, such as multiplexors to control the direction of data, flip-flops for handling clock domain crossings, and timing logic.

Figure 11:
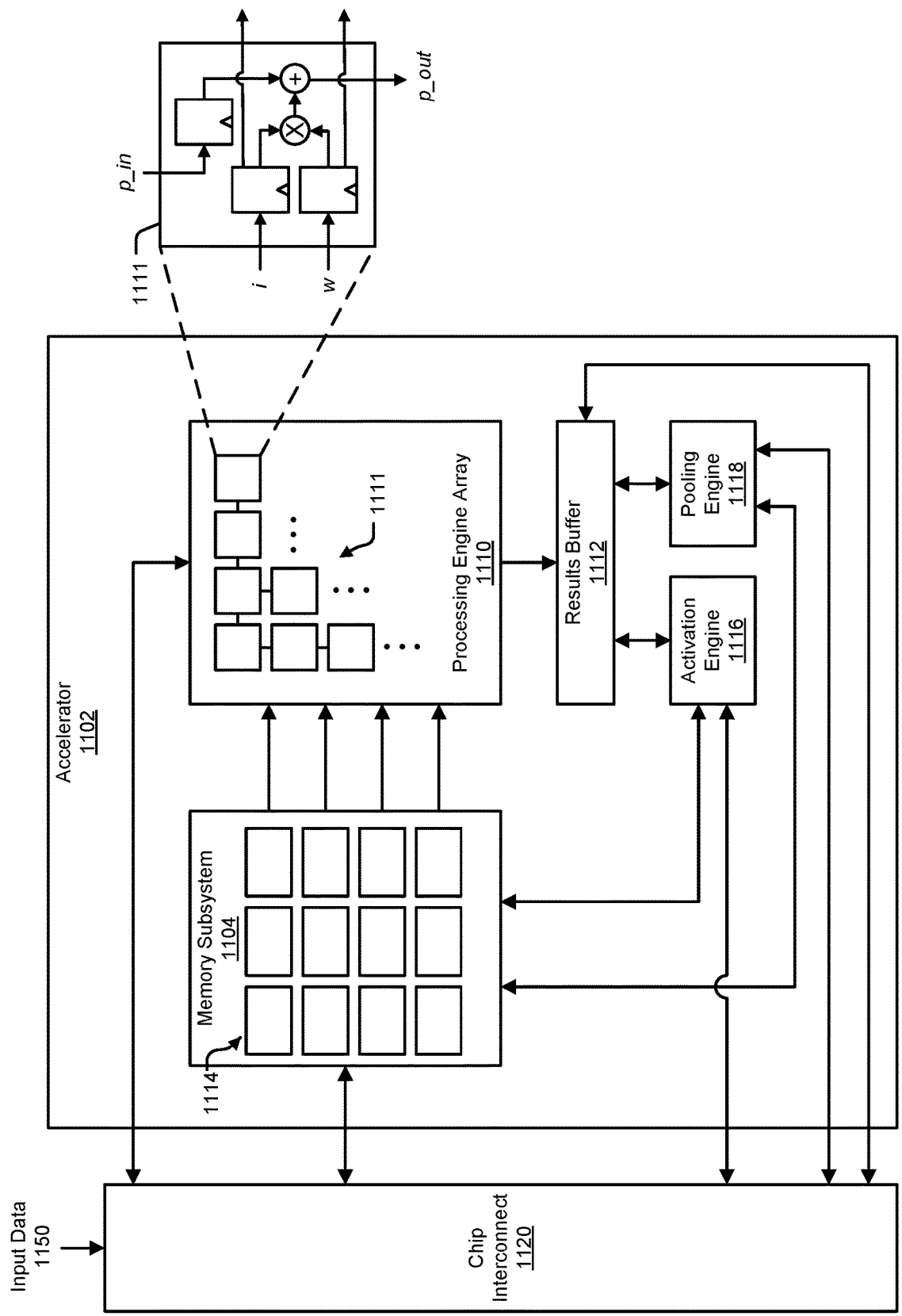
FIG. 11 is a block diagram illustrating an example of an integrated circuit device.

FIG. 11 is a block diagram illustrating an example of an integrated circuit device. The example of FIG. 11 illustrates an accelerator 1102. In various examples, the accelerator 1102, for a set of input data (e.g., input data 1150), can execute computations using a processing engine array 1110, an activation engine 1116, and/or a pooling engine 1118. In some examples, the example accelerator 1102 may be an integrated circuit component of a processor, such as a neural network processor. The processor may have other integrated circuit components, including additional accelerator engines.

In various implementations, the memory subsystem 1104 can include multiple memory banks 1114. In these implementations, each memory bank 1114 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1114. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1104 can permit simultaneous access to the read or write channels of multiple memory banks. As another example, the memory subsystem 1104 can include arbitration logic such that arbitration between, for example, the outputs of multiple memory banks 1114 can result in more than one memory bank's output being used. In these and other examples, though globally managed by the memory subsystem 1104, each memory bank can be operated independently of any other.

Having the memory banks 1114 be independently accessible can increase the efficiency of the accelerator 1102. For example, values can be simultaneously read and provided to each row of the processing engine array 1110, so that the entire processing engine array 1110 can be in use in one clock cycle. As another example, the memory banks 1114 can be read at the same time that results computed by the processing engine array 1110 are written to the memory subsystem 1104. In contrast, a single memory may be able to service only one read or write at a time. With a single memory, multiple clock cycles can be required, for example, to read input data for each row of the processing engine array 1110 before the processing engine array 1110 can be started.

In various implementations, the memory subsystem 1104 can be configured to simultaneously service multiple clients, including the processing engine array 1110, the activation engine 1116, the pooling engine 1118, and any external clients that access the memory subsystem 1104 over a communication fabric 1120. In some implementations, being able to service multiple clients can mean that the memory subsystem 1104 has at least as many memory banks as there are clients. In some cases, each row of the processing engine array 1110 can count as a separate client. In some cases, each column of the processing engine array 1110 can output a result, such that each column can count as a separate write client. In some cases, output from the processing engine array 1110 can be written into the memory banks 1114 that can then subsequently provide input data for the processing engine array 1110. As another example, the activation engine 1116 and the pooling engine 1118 can include multiple execution channels, each of which can be separate memory clients. The memory banks 1114 can be implemented, for example, using static random access memory (SRAM).

In various implementations, the memory subsystem 1104 can include control logic. The control logic can, for example, keep track of the address spaces of each of the memory banks 1114, identify memory banks 1114 to read from or write to, and/or move data between the memory banks 1114. In some implementations, memory banks 1114 can be hardwired to particular clients. For example, a set of memory banks 1114 can be hardwired to provide values to the rows of the processing engine array 1110, with one memory bank servicing each row. As another example, a set of memory banks can be hard wired to receive values from columns of the processing engine array 1110, with one memory bank receiving data for each column.

The processing engine array 1110 is the computation matrix of the example accelerator 1102. The processing engine array 1110 can, for example, execute parallel integration, convolution, correlation, and/or matrix multiplication, among other things. The processing engine array 1110 includes multiple processing engines 1111, arranged in rows and columns, such that results output by one processing engine 1111 can be input directly into another processing engine 1111. Processing engines 1111 that are not on the outside edges of the processing engine array 1110 thus can receive data to operate on from other processing engines 1111, rather than from the memory subsystem 1104.

In various examples, the processing engine array 1110 uses systolic execution, in which data arrives at each processing engine 1111 from different directions at regular intervals. In some examples, input data can flow into the processing engine array 1110 from the left and weight values can be loaded at the top. In some examples weights and input data can flow from the left and partial sums can flow from top to bottom. In these and other examples, a multiply-and-accumulate operation moves through the processing engine array 1110 as a diagonal wave front, with data moving to the right and down across the array. Control signals can be input at the left at the same time as weights, and can flow across and down along with the computation.

In various implementations, the number of columns in the processing engine array 1110 determines the computational capacity of the processing engine array 1110, and the number of rows determines the required memory bandwidth for achieving maximum utilization of the processing engine array 1110. The processing engine array 1110 can have, for example, 64 columns and 428 rows, or some other number of columns and rows.

An example of a processing engine 1111 is illustrated in FIG. 11 in an inset diagram. As illustrated by this example, a processing engine 1111 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1111.

In the illustrated example, an input from above can include a partial sum, pin, provided either from another processing engine 1111 or from a previous round of computation by the processing engine array 1110. When starting a computation for a new set of input data, the top row of the processing engine array 1110 can receive a fixed value for p_in, such as zero. As illustrated by this example, i and w are multiplied together and the result is summed with p_in to produce a new partial sum, p_out, which can be input into another processing engine 1111. Various other implementations of the processing engine 1111 are possible.

Outputs from the last row in the processing engine array 1110 can be temporarily stored in the results buffer 1112. The results can be intermediate results, which can be written to the memory banks 1114 to be provided to the processing engine array 1110 for additional computation. Alternatively, the results can be final results, which, once written to the memory banks 1114 can be read from the memory subsystem 1104 over the communication fabric 1120, to be output by the system.

In some implementations, the accelerator 1102 includes an activation engine 1116. In these implementations, the activation engine 1116 can combine the results from the processing engine array 1110 into one or more output activations. For example, for a convolutional neural network, convolutions from multiple channels can be summed to produce an output activation for a single channel. In other examples, accumulating results from one or more columns in the processing engine array 1110 may be needed to produce an output activation for a single node in the neural network. In some examples, activation engine 1116 can be bypassed.

In various examples, the activation engine 1116 can include multiple separate execution channels. In these examples, the execution channels can correspond to the columns of the processing engine array 1110, and can perform an operation on the outputs of a column, the result of which can be stored in the memory subsystem 1104. In these examples, the activation engine 1116 may be able to perform between 1 and n parallel computations, where n is equal to the number of columns in the processing engine array 1110. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1102 can include a pooling engine 1118. Pooling is the combining of outputs of the columns of the processing engine array 1110. Combining can include for example, computing a maximum value, a minimum value, an average value, a median value, a summation, a multiplication, or another logical or mathematical combination. In various examples, the pooling engine 1118 can include multiple execution channels that can operating on values from corresponding columns of the processing engine array 1110. In these examples, the pooling engine 1118 may be able to perform between 1 and n parallel computations, where n is equal to the number of columns in the processing engine array 1110. In various examples, execution channels of the pooling engine 1118 can operate in parallel and/or simultaneously. In some examples, the pooling engine 1118 can be bypassed.

Herein, the activation engine 1116 and the pooling engine 1118 may be referred to collectively as execution engines. The processing engine array 1110 is another example of an execution engine. Another example of an execution engine is a Direct Memory Access (DMA) engine, which may be located outside the accelerator 1102.

Input data 1150 can arrive over the communication fabric 1120. The communication fabric 1120 can connect the accelerator 1102 to other components of a processor, such as a DMA engine that can obtain input data 1150 from an Input/Output (I/O) device, a storage drive, or a network interface. The input data 1150 can be, for example one-dimensional data, such as a character string or numerical sequence, or two-dimensional data, such as an array of pixel values for an image or frequency and amplitude values over time for an audio signal. In some examples, the input data 1150 can be three-dimensional, as may be the case with, for example, the situational information used by a self-driving car or virtual reality data. In some implementations, the memory subsystem 1104 can include a separate buffer for the input data 1150. In some implementations, the input data 1150 can be stored in the memory banks 1114 when the accelerator 1102 receives the input data 1150.

In some examples, the accelerator 1102 can implement a neural network processing engine. In these examples, the accelerator 1102, for a set of input data 1150, can execute a neural network to perform a task for which the neural network was trained. Executing a neural network on a set of input data can be referred to as inference or performing inference.

The weights for the neural network can be stored in the memory subsystem 1104, along with input data 1150 on which the neural network will operate. The neural network can also include instructions, which can program the processing engine array 1110 to perform various computations on the weights and the input data. The instructions can also be stored in the memory subsystem 1104, in the memory banks 1114 or in a separate instruction buffer. The processing engine array 1110 can output intermediate results, which represent the outputs of individual layers of the neural network. In some cases, the activation engine 1116 and/or pooling engine 1118 may be enabled for computations called for by certain layers of the neural network.

The accelerator 1102 can store the intermediate results in the memory subsystem 1104 for inputting into the processing engine array 1110 to compute results for the next layer of the neural network. The processing engine array 1110 can further output final results from a last layer of the neural network. The final results can be stored in the memory subsystem 1104 and then be copied out to host processor memory or to another location.

Figure 12:
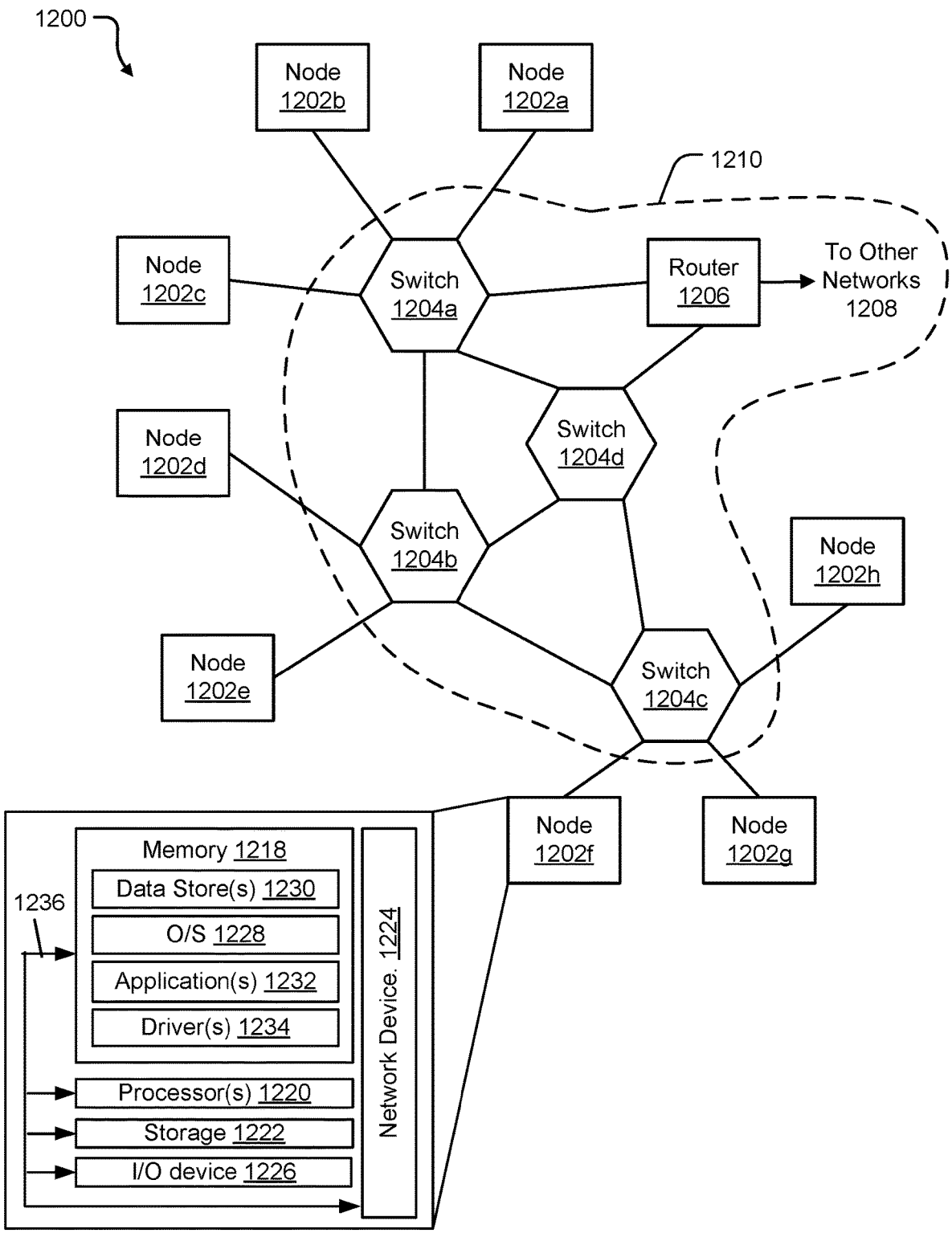
FIG. 12 includes a diagram of an example network.

FIG. 12 includes a diagram of an example network 1200, which can include one or more host systems, such as the host system illustrated in FIG. 9. For example, the example network 1200 of FIG. 12 includes multiple nodes 1202a-1202h, one or more of which can be a host system such as is illustrated in FIG. 9. Others of the nodes 1202a-1202h can be other computing devices, each of which include at least a memory for storing program instructions, a processor for executing the instructions, and a network interface for connecting to the network 1200.

In various examples, the network 1200 can be used to process data. For example, input data can be received at one of the nodes 1202a-1202h or from other networks 1208 with which the network 1200 can communicate. In this example, the input data can be directed to a node in the network 1200 that includes an acceleration engine, for the acceleration engine to operate on and produce a result. The result can then be transferred to the node or other network from which the input data was received. In various examples, input data can be accumulated from various sources, including one or more of the nodes 1202a-1202h and/or computing devices located in the other networks 1208, and the accumulated input data can be directed to one or more host systems in the network 1200. Results from the host systems can then be distributed back to the sources from which the input data was gathered.

In various examples, one or more of the nodes 1202a-1202h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 12, the nodes 1202a-1202h are connected to one another using a switched architecture with point-to point links. The switched architecture includes multiple switches 1204a-1204d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1204a-1204d of FIG. 12 may be connected to the nodes 1202a-1202h and provide multiple paths between any two nodes.

The network 1200 may also include one or more network devices for connection with other networks 1208, such as a router 1206. Routers use headers and forwarding tables to determine the best path for forwarding the packets, and use protocols such as internet control message protocol (ICMP) to communicate with each other and configure the best route between any two devices. The router 1206 of FIG. 12 can be used to connect to other networks 1208 such as subnets, LANs, wide area networks (WANs), and/or the Internet.

In some examples, network 1200 may include any one or a combination of many different types of networks, such as cable networks, the Internet, wireless networks, cellular networks and other private and/or public networks. The interconnected switches 1204a-1204d and the router 1206, if present, may be referred to as a switch fabric 1210, a fabric, a network fabric, or simply a network. In the context of a computer network, terms "fabric" and "network" may be used interchangeably herein.

The nodes 1202a-1202h may be any combination of host systems, processor nodes, storage subsystems, and I/O chassis that represent user devices, service provider computers or third party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202a-1202h may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202a-1202h, the memory 1218 may be volatile (such as RAM) and/or non-volatile (such as ROM, flash memory, etc.). The memory 1218 may include an operating system 1228, one or more data stores 1230, one or more application programs 1232, one or more drivers 1234, and/or services for implementing the features disclosed herein.

The operating system 1228 may support nodes 1202a-1202h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1228 may also be a proprietary operating system.

The data stores 1230 may include permanent or transitory data used and/or operated on by the operating system 1228, application programs 1232, or drivers 1234. Examples of such data include web pages, video data, audio data, images, user data, and so on. The information in the data stores 1230 may, in some implementations, be provided over the network(s) 1208 to user devices. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alternatively or additionally, some drivers 1234 may provide communication between application programs 1232 and the operating system 1228, and/or application programs 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202a-1202h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202a-1202h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202a-1202h may also include I/O device(s) 1226, such as a keyboard, a mouse, a pen, a voice input device, a touch input device, a display, speakers, a printer, and the like. The node(s) 1202a-1202h may also include one or more communication channels 1236. A communication channel 1236 may provide a medium over which the various components of the node(s) 1202a-1202h can communicate. The communication channel or channels 1236 may take the form of a bus, a ring, a switching fabric, or a network.

The node(s) 1202a-1202h may also contain network device(s) 1224 that allow the node(s) 1202a-1202h to communicate with a stored database, another computing device or server, user terminals and/or other devices on the network(s) 1200.

In some implementations, the network device 1224 is a peripheral device, such as a PCI-based device. In these implementations, the network device 1224 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1224 may be connected to a computing system using a PCIe interface.

A PCI-based device may include one or more functions. A "function" describes operations that may be provided by the network device 1224. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1224 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for synchronizing operations of execution engines of an integrated circuit device executing a neural network, the method comprising:
    receiving, at a computing device, a description of the neural network;
    obtaining, based on the description of the neural network, a plurality of operations to be performed by N execution engines of the integrated circuit device, wherein the plurality of operations are connected through a plurality of edges corresponding to data dependencies or resource dependencies between the plurality of operations;
    generating a dependency vector for each operation of the plurality of operations, wherein the dependency vector of a corresponding operation includes N values that are calculated based on which execution engine of the N execution engines is to perform the corresponding operation and further based on the N values of one or more dependency vectors calculated for one or more immediately preceding operations of the plurality of operations; and
    assigning, for each edge of one or more of the plurality of edges, an event register of a plurality of event registers to the corresponding edge based on a comparison between:
        the dependency vector generated for a start operation associated with the corresponding edge; and
        the dependency vector generated for an end operation associated with a previous edge of the plurality of edges, wherein the event register was previously assigned to the previous edge.

2. The method of claim 1, further comprising:
    for each edge of the one or more of the plurality of edges, determining that the N values of the dependency vector generated for the start operation associated with the corresponding edge are greater than or equal to the N values of the dependency vector generated for the end operation associated with the previous edge.

3. The method of claim 1, wherein assigning the event register to the corresponding edge is further based on a second comparison between:
    the dependency vector generated for a same-engine predecessor operation that immediately precedes an end operation associated with the corresponding edge; and
    the dependency vector generated for the end operation associated with the previous edge.

4. The method of claim 3, further comprising:
    for each edge of the one or more of the plurality of edges, determining that the N values of the dependency vector generated for the same-engine predecessor operation are greater than or equal to the N values of the dependency vector generated for the end operation associated with the previous edge.

5. A method comprising:
    obtaining a description of a plurality of operations to be performed by multiple execution engines of an integrated circuit device, wherein the plurality of operations are connected through a plurality of edges;
    generating a dependency vector for each operation of the plurality of operations, wherein the dependency vector of a corresponding operation includes a set of values that are calculated based on the set of values of one or more dependency vectors calculated for one or more immediately preceding operations of the plurality of operations; and
    assigning, for each edge of one or more of the plurality of edges, an event register of a plurality of event registers in the integrated circuit device to the corresponding edge based on the dependency vector generated for a start operation associated with the corresponding edge.

6. The method of claim 5, wherein the set of values are integers.

7. The method of claim 5, wherein the integrated circuit device includes N number of execution engines to perform the plurality of operations, and wherein the dependency vector has N number of values.

8. The method of claim 5, wherein the set of values are calculated further based on which execution engine of the multiple execution engines is to perform the corresponding operation.

9. The method of claim 5, wherein the description of the plurality of operations is a description of a neural network.

10. The method of claim 5, wherein assigning the event register to the corresponding edge is further based on the dependency vector generated for an end operation associated with a previous edge of the plurality of edges, wherein the event register was previously assigned to the previous edge.

11. The method of claim 10, wherein assigning the event register to the corresponding edge is further based on a comparison between:
- the dependency vector generated for the start operation associated with the corresponding edge; and
- the dependency vector generated for the end operation associated with the previous edge.

12. The method of claim 11, wherein assigning the event register to the corresponding edge is further based on a second comparison between:
- the dependency vector generated for a same-engine predecessor operation that immediately precedes an end operation associated with the corresponding edge; and
- the dependency vector generated for the end operation associated with the previous edge.

13. A non-transitory computer-readable medium having stored therein instructions that, when executed by one or more processors, cause the one or more processors to execute a compiler, the compiler performing operations including:
- obtaining a description of a plurality of operations to be performed by multiple execution engines of an integrated circuit device, wherein the plurality of operations are connected through a plurality of edges;
- generating a dependency vector for each operation of the plurality of operations, wherein the dependency vector of a corresponding operation includes a set of values that are calculated based on the set of values of one or more dependency vectors calculated for one or more immediately preceding operations of the plurality of operations; and
- assigning, for each edge of one or more of the plurality of edges, an event register of a plurality of event registers to the corresponding edge based on the dependency vector generated for a start operation associated with the corresponding edge.

14. The non-transitory computer-readable medium of claim 13, wherein the set of values are integers.

15. The non-transitory computer-readable medium of claim 13, wherein the integrated circuit device includes N number of execution engines to perform the plurality of operations, and wherein the dependency vector has N number of values.

16. The non-transitory computer-readable medium of claim 13, wherein the set of values are calculated further based on which execution engine of the multiple execution engines is to perform the corresponding operation.

17. The non-transitory computer-readable medium of claim 13, wherein the description of the plurality of operations is a description of a neural network.

18. The non-transitory computer-readable medium of claim 13, wherein assigning the event register to the corresponding edge is further based on the dependency vector generated for an end operation associated with a previous edge of the plurality of edges, wherein the event register was previously assigned to the previous edge.

19. The non-transitory computer-readable medium of claim 18, wherein assigning the event register to the corresponding edge is further based on a comparison between:
- the dependency vector generated for the start operation associated with the corresponding edge; and
- the dependency vector generated for the end operation associated with the previous edge.

20. The non-transitory computer-readable medium of claim 19, wherein assigning the event register to the corresponding edge is further based on a second comparison between:
- the dependency vector generated for a same-engine predecessor operation that immediately precedes an end operation associated with the corresponding edge; and
- the dependency vector generated for the end operation associated with the previous edge.

* * * * *